United States Patent
Finberg

(10) Patent No.: US 8,792,879 B2
(45) Date of Patent: Jul. 29, 2014

(54) SYSTEM AND METHOD OF PERFORMING REMOTE DIAGNOSTICS ON A COMPUTING DEVICE

(76) Inventor: Scott A. Finberg, Wilson, NC (US)

(*) Notice: Subject to any disclaimer, the term of this patent is extended or adjusted under 35 U.S.C. 154(b) by 273 days.

(21) Appl. No.: 13/223,525

(22) Filed: Sep. 1, 2011

(65) Prior Publication Data

US 2013/0059578 A1 Mar. 7, 2013

(51) Int. Cl.
*H04W 24/00* (2009.01)
*G06F 11/16* (2006.01)
*G06F 11/00* (2006.01)

(52) U.S. Cl.
USPC ............... 455/425; 714/4.4; 714/4.3; 714/27

(58) Field of Classification Search
CPC ............... H04W 24/00; G06F 11/2294; G06F 11/0748; G06F 11/0793; H04B 17/0057
USPC .................. 455/425; 714/4.4, 4.3, 27, 3.4
See application file for complete search history.

(56) References Cited

U.S. PATENT DOCUMENTS

| | | |
|---|---|---|
| 5,367,667 A | 11/1994 | Wahlquist et al. |
| 6,065,136 A | 5/2000 | Kuwabara |
| 6,230,287 B1 | 5/2001 | Pinard et al. |
| 6,611,865 B1 | 8/2003 | Perugini et al. |
| 7,260,597 B1 | 8/2007 | Hofrichter et al. |
| 2011/0145445 A1* | 6/2011 | Malamant et al. ............ 710/16 |
| 2013/0031410 A1* | 1/2013 | Katz et al. .................... 714/27 |

* cited by examiner

*Primary Examiner* — Opiribo Georgewill
(74) *Attorney, Agent, or Firm* — Coats & Bennett, PLLC

(57) ABSTRACT

A user's cellular communication device communicates with a peer cellular communication device to perform diagnostic or repair functions on a computer connected to the user's device. The user's device is connected to the computer via a cable. The remote device commands the user's device to query the computer via the cable connection for information about the computer. Based on that information, the remote device generates commands to send to the user's device. Upon receipt, the user's device employs the commands to execute selected diagnostic and repair programs resident on the computer.

24 Claims, 16 Drawing Sheets

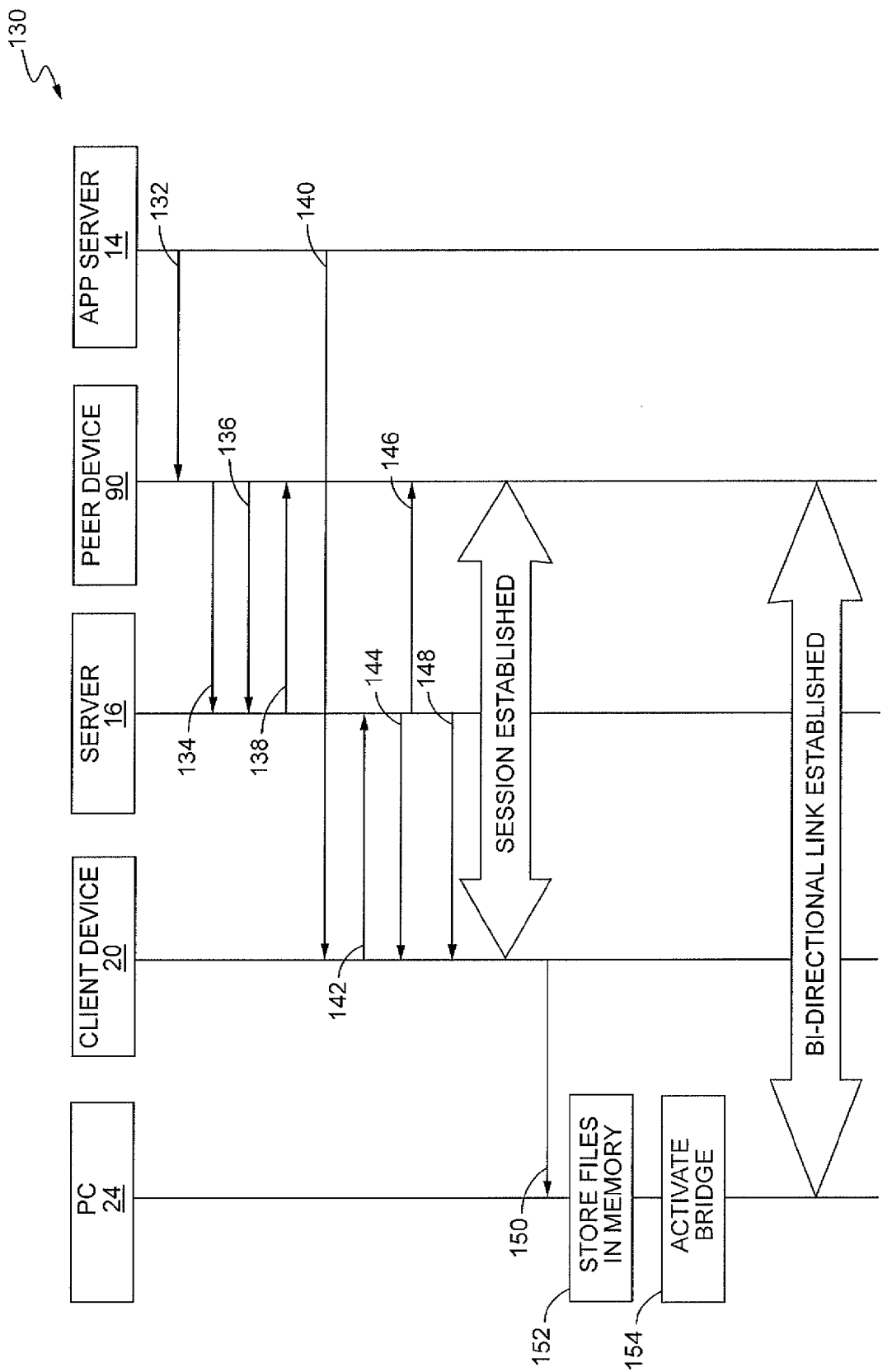

SYSTEM AND METHOD OF PERFORMING REMOTE DIAGNOSTICS ON A COMPUTING DEVICE

FIELD OF THE INVENTION

The present invention relates to systems and methods for using a cellular communication device to perform diagnostic and repair functions on computing devices.

BACKGROUND

Computing devices, such as personal desktop and laptop computers, for example, are commonplace. These devices allow users to perform many different types of functions and simplify many facets of their lives. However, for all their usefulness, computers are very complex machines. Particularly, modern computers comprise many different types of integrated circuits, and require software programs and data to control their operation. Such complexities, along with the ever-changing technological advances that define modern computers, make it difficult for many users to diagnose and repair the problems that affect their computer. This task is even more difficult for users that have little or no technical knowledge.

In many cases, when users are faced with computer related problems, they obtain the services of a live technician. Usually, technicians are able to diagnose and repair the problems they detect; however, there are a host of issues that complicate this task for both users and technicians. For example, it can be difficult for users to find a qualified technician. Once located, the time needed by the technician to respond may be lengthy. Further, the cost of consulting a qualified technician can be costly. And, if replacement parts are needed, the cost to the user for servicing the computer can sometimes exceed the value of the device.

For a technician, the difficulty in interfacing with a given computer may hamper the ability to quickly and accurately diagnose and repair a computer-related problem. For example, consider a situation where a computer cannot connect to a communications network. Further consider that the user of the computer may lack the technical skills needed to connect the computer to the network. In such cases, the technician would not be able to diagnose and repair the computer remotely. Instead, the technician would have to "walk" the inexperienced user through a maze of problem solving and repair techniques, or travel to the site of the computer to make on-site repair. This can be extremely frustrating for both the technician and the user. Further, there is no guarantee that the technician can diagnose and fix the problem. Thus, the user could still be required to take the computer to the technician, or the technician might have to travel to the site of the computer.

SUMMARY

The present invention provides a system and method to facilitate remote computer diagnostics and repair. The invention provides users with access to a network of peer technicians equipped with a cellular device (e.g., a Smartphone) that are able to diagnose and repair a user's computer from a remote location. In one embodiment, the user is also equipped with a cellular device (e.g., a Smartphone) that is connected to the computer via a cable or some other link so that remote diagnostics are available even when the user is having network connection problems.

The user's device first downloads a plurality of diagnostic and repair application programs from an application server. Once downloaded, the user's device establishes a communications link with the computer. A programmable controller on the user's device then transfers the application programs to the computer via the established link. The transferred application programs include an emulator agent that configures the computer to emulate a cellular communications device, and one or more diagnostic and/or repair functions. Once the programs are in memory of the computer, the user's device sends commands to activate the emulator agent on the computer and to control the computer to execute selected diagnostic and/or repair functions.

In one embodiment, a peer technician has a cellular device and is available to perform the diagnostic and repair functions for the user. Particularly, a network control server maintains a list of peer technicians available to perform the diagnostic and repair functions. The particular peer technician that performs the functions for the user may be selected by the network server, or by the user from a list of peer technicians provided by the server. The selected peer technician, via the peer cellular device, generates and sends commands to the client device via the server. Upon receipt, the client device sends the commands to the emulator agent to control the computer to perform the diagnostics and repair functions.

The present invention also provides a network server configured to broker the communications between the peer device and the client device. In one embodiment, the server maintains a list of technicians that are available to run the diagnostics and repair programs. The server can either select an available technician for the user, or provide a list of technicians to the user. In the latter case, the user may select one of the technicians from the list. The server notifies the selected technician, establishes a communications link between the user's device and the peer device, and then processes text messages that are communicated between the user and the peer technician.

In one embodiment, for example, the peer technician controls his or her cellular device to generate a command for a selected diagnostics and repair function and sends the command to the user's device. The command may be embedded in a text message, for example. Upon receipt, the server parses the text message, logs the information in memory, and forwards the message to the user's device.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIGS. 8A-8B show a signal diagram that illustrates how a peer cellular communications device diagnoses and/or repairs a computing device according to one embodiment of the present invention.

DETAILED DESCRIPTION

The present invention provides a system and method for developing a widespread network of peer technicians that are able to diagnose and repair a user's computer from a remote location. More specifically, a user's cellular communication device is configured to send commands to the computer to control the computer to perform selected diagnostic and repair functions. Such functions are embodied, for example, as one or more application programs that are downloaded to, and stored on, the user's cellular device.

In operation, the user's cellular device is connected to the computer. Once connected, the user's device installs the diagnostics and repair programs on the computer and generates the commands needed for the computer to execute the diagnostics and repair programs. The results of the programs are provided to the user's cellular device so that the user can determine an appropriate course of action.

In one embodiment, a peer technician, who may be selected by the user or for the user, utilizes his or her own cellular communication device to assist the user in diagnosing and repairing the computing device. Specifically, using a special application program executing on the peer technician's cellular device, the peer technician can generate the commands needed for the computer to execute the diagnostics and repair programs and send them to the client's cellular device. Upon receipt, the user's cellular device uses the commands to control the computer to execute the diagnostics and repair programs as previously described. To gauge the success of the diagnostic and repair programs, the user and/or the peer technician receive reports from the computing device for analysis.

Figure 1:
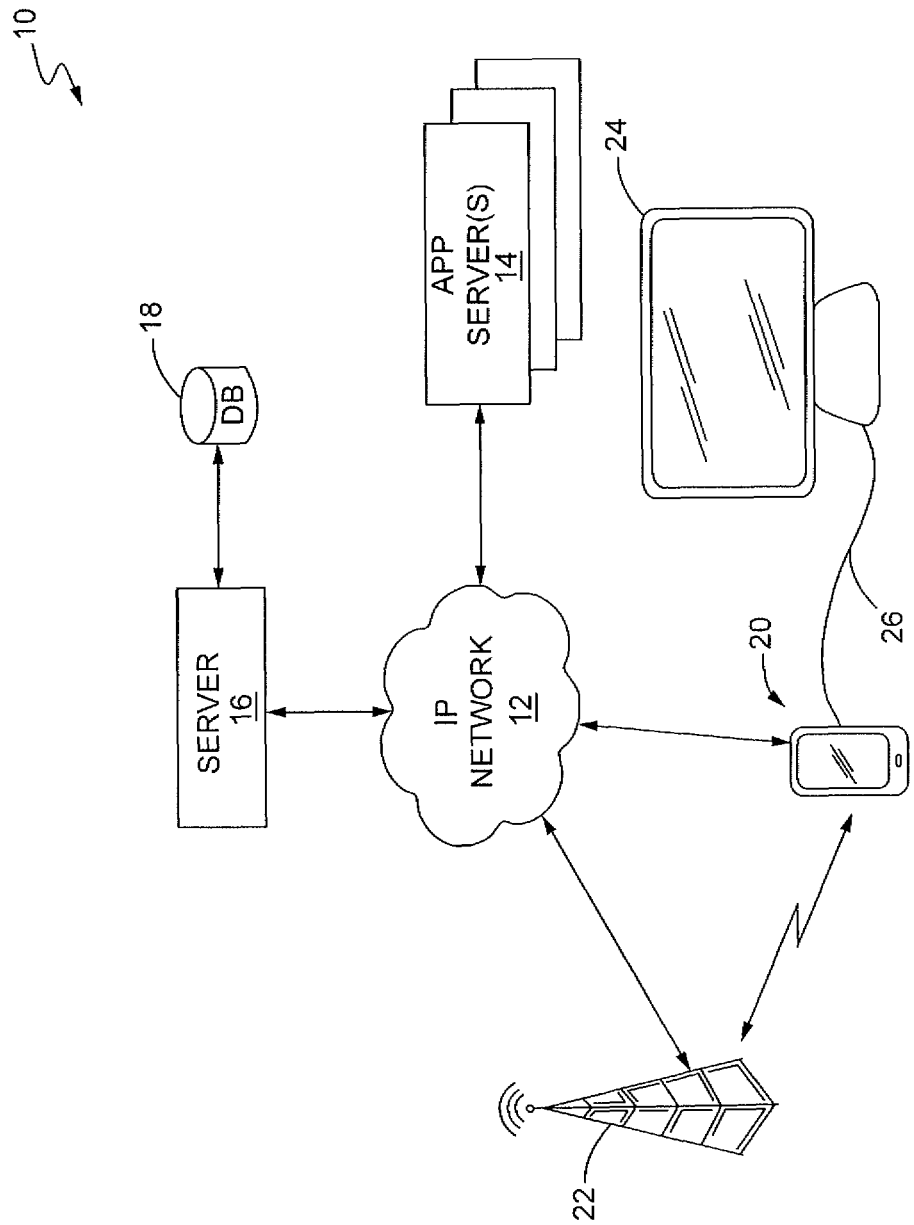
FIG. 1 is a block diagram of a communications system configured according to one embodiment of the present invention.

Turning now to the drawings, the present invention is explained in greater detail. FIG. 1 illustrates a communications system 10 configured according to one embodiment of the present invention. As seen in FIG. 1, system 10 comprises an IP network 12, such as the Internet, one or more application servers 14, a control server 16 connected to a database (DB) 18, and a client cellular communications device 20. A cellular network 22 may also exist to facilitate voice and/or data communications between the client device 20, the servers 14, 16, and one or more remote parties. In one embodiment, the cellular network 22 comprises a Radio Access Network (RAN) that operates according to a known standard such as Global System for Mobile Communications (GSM), cdma2000, UMTS, Wideband CDMA, and Long Term Evolution (LTE).

The client device 20 may be, for example, a Smartphone such as an iPHONE or an ANDROID, or some other cellular device capable of communicating data to and from the IP network 12. According to the present invention, the client device 20 is configured to diagnose and repair hardware or software related problems occurring on the user's computer 24. In one embodiment, the client device 20 first obtains a control program, a messaging program, and one or more diagnostic and repair programs from the application server 14 via IP network 12 and stores them in memory 38. Alternatively, if client device 20 cannot connect to the IP network 12, the client device 20 may download the programs from the server 14 via the cellular network 22 and store them in memory 38. However the client device 20 obtains the programs, the user of client device 20 may purchase the programs, or purchase a limited license to use the programs. Once downloaded, the user registers client device 20 with the central server 16, for example, and communicatively connects the client device 20 to computer 24 using a physical transfer medium, such as a Universal Serial Bus (USB) cable 26. After connecting the client device 20, the client device 20 transfers and installs the diagnostic and repair programs to memory on the computer 24. The client device 20 then generates and sends commands to the computer 24 to control the computer 24 to execute the programs to diagnose and repair technical problems occurring on the computer 24.

The invention is particularly useful in situations where the computer 24 is not connected, or cannot be connected, to the IP network 12. Conventionally, when faced with a lack of connectivity, a technician assigned to troubleshoot and repair the computer 24 would have to travel to the location of computer 24 to perform diagnostic tests and repair any hardware/ software problems detected. Alternatively, the user would have to disconnect the computer 24 from its associated wires and connections to carry the computer to a service center. In either case, the process of diagnosing and repairing a computer 24 can be costly and time consuming.

With the present invention, however, the client device 20 is connected directly to the computer 24 using a physical connection. This physical connection, along with corresponding software programs on both the client device 20 and the computer 24, provides a "communications bridge" between the client device 20 and the computer 24 over which the client device 20 downloads and installs the diagnostic and repair programs on the computer 24. Such a bridge negates the need for a network-based connection between the client device 20 and the computer 24, and helps to alleviate the frustrating and time-consuming process of attempting to "walk" a user through a complex and detailed diagnosing and repair process.

Figure 2:
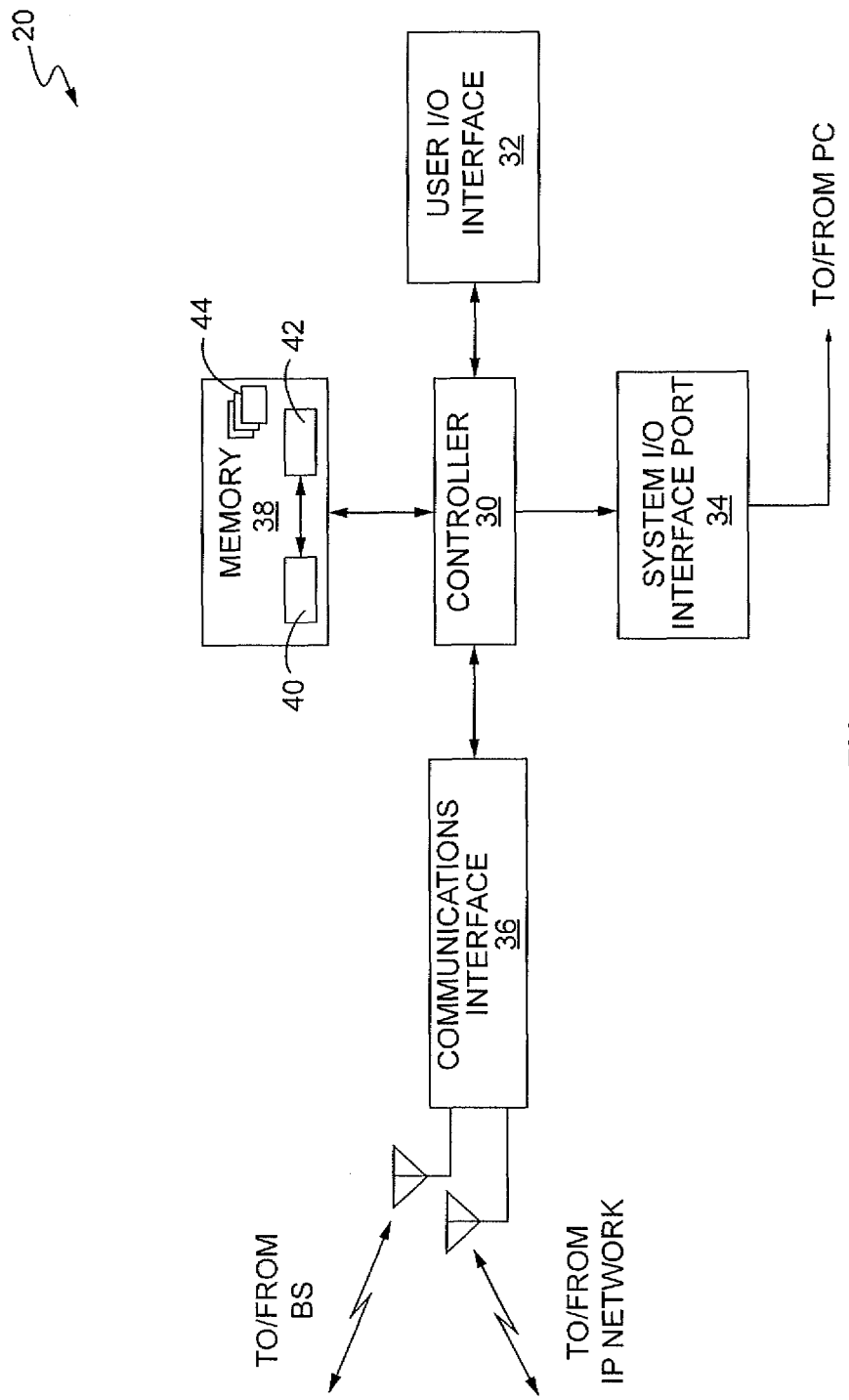
FIG. 2 is a block diagram illustrating some components of a client cellular communications device configured according to one embodiment of the present invention.

FIG. 2 is a block diagram that illustrates some of the components of a client device 20 configured to operate according to one embodiment of the present invention. As seen in FIG. 2, the client device 20 includes, inter alia, a programmable controller 30, a user Input/Output (I/O) interface 32, a system I/O interface 34, a communications interface 36, and a memory 38. In accordance with the present invention, the memory 38 is configured to store a control program 40, a messaging program 42, and one or more diagnostic and repair programs 44 (collectively referred to herein as "application programs 40, 42, 44"). As described in more detail later, the diagnostic and repair programs 44 include an emulator agent that configures the computer 24 to send and receive data with the client device 24, and in some embodiments, a command shell that executes the diagnostics and repair programs 44 on computer 24 responsive to commands received from the client device 20.

The controller 30 comprises a programmable processor that is programmed to control the operation of the client device 20 according to one or more programs and data stored in memory 38. As is known in the art, such programs and data control the ability of the client device 20 to perform functions such as establishing a wireless communications link with a remote party, and transmitting and receiving data with the remote party over that link. However, as described later in more detail, the controller 30 may also be configured to generate commands that control computer 24 to perform diagnostic and repair functions. Additionally, the controller 30 may itself be remotely commanded to generate the commands necessary for controlling the computer 24 to perform the diagnostic and repair functions through text messaging.

The User I/O Interface (UI) 32 generally includes one or more components that permit the user to interact with, and control the operation of, the client device 20. As is known in the art, this generally includes components such as a speaker and a microphone, and may further include one or more user controls comprising a variety of knobs, switches, keys, button controls, or dials, for example, distributed across the housing of the client device 20.

Figure 3:
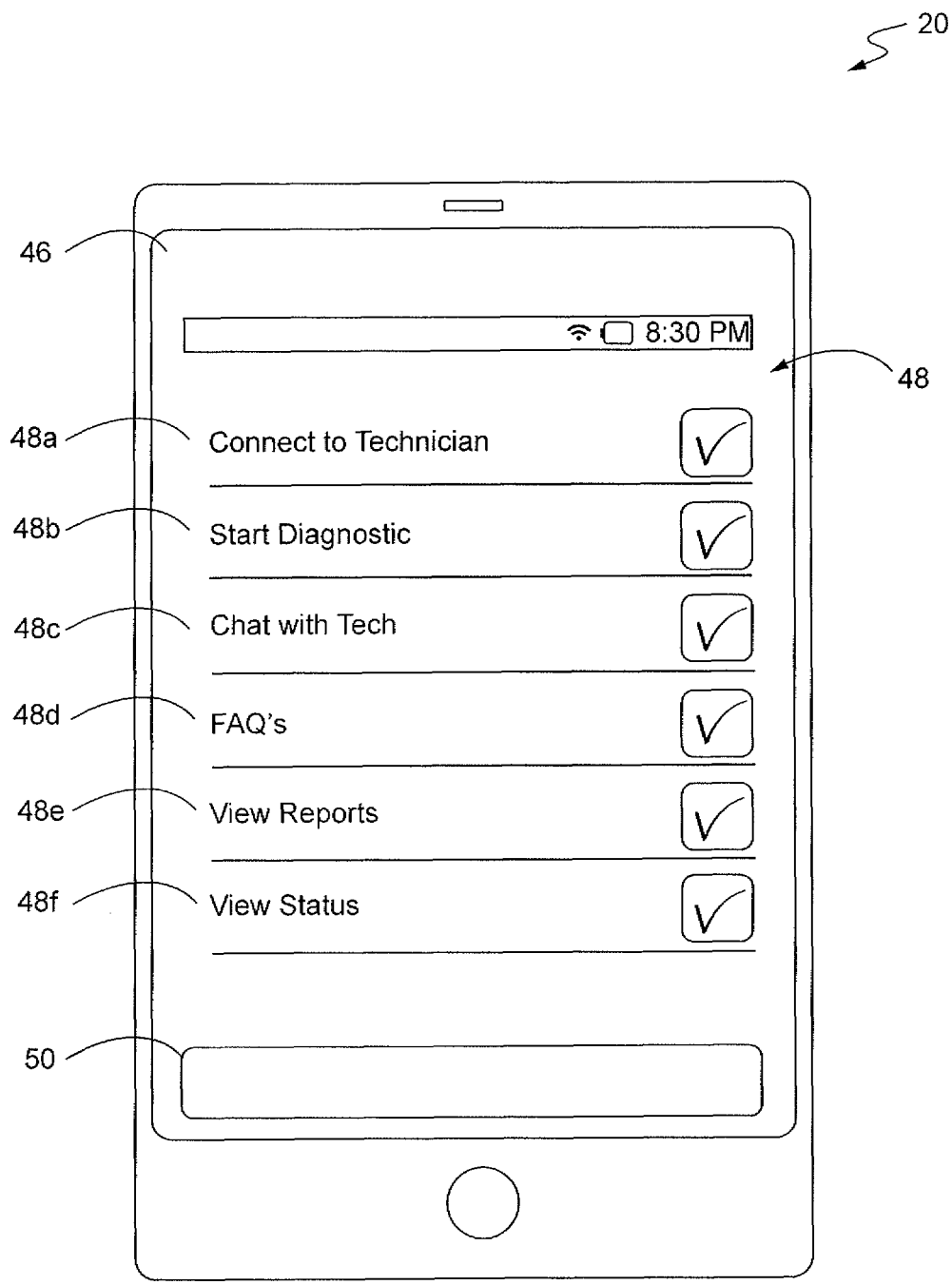
FIG. 3 is a perspective view of a Graphical User Interface (GUI) on a client cellular communications device configured according to one embodiment of the present invention.

In one embodiment, the UI 32 also includes a touch-sensitive display 46 (see FIG. 3). According the present invention, the control program 40, when executed by controller 30, provides a Graphical User Interface (GUI) on touch-sensitive display 46. The GUI permits the user to intuitively interact with control program 40 executing on the client device 20 using touch. More particularly, the GUI displays a plurality of buttons or controls and handles user touches. Each button or control is associated with a different command or action that may be used to diagnose and/or repair hardware and/or software problems affecting computer 24. In operation, the touch-sensitive display 46 detects which buttons or controls the user touches, and then generates a signal to notify controller 30. In response, the controller 30 generates the command(s) needed to execute the appropriate diagnostic and/or repair functions, and sends the command(s) through the link to the PC.

The system I/O interface 34 comprises a hardware port disposed in the housing of the client device 20. Conventionally, the system I/O interface 34 receives one end of a cable that connects the client device 20 to a charging source. However, in one embodiment of the present invention, the system I/O interface 34 is also configured to receive a USB cable 26 that connects the client device 20 to a USB port on the computer 24. Via the USB cable 26, the client device 20 copies the diagnostics and repair programs 44 onto the computer 24. Once installed, the controller 30 generates and sends commands to computer 24 to cause the computer 24 to execute selected diagnostic and repair programs 44.

The communications interface 36 permits the user of client device 20 to communicate voice and exchange data with one or more remote parties and/or devices, such as servers 14 and 16. As seen in FIG. 2, the communications interface 36 may comprise a cellular transceiver and/or a short-range transceiver that allows the client device 20 to communicate with the remote parties and devices via the cellular network 22 and/or IP network 12. Particularly, the cellular transceiver comprises a fully functional cellular radio transceiver, and operates according to any known standard, including Global System for Mobile Communications (GSM), cdma2000, UMTS, Wideband CDMA, and Long Term Evolution (LTE). The short-range transceiver is configured to transmit signals to and receive signals from another device (e.g., a router) having a corresponding short-range transceiver. In one embodiment, the short-range transceiver comprises a BLUETOOTH transceiver or RF transceiver operating according to the IEEE 802.11 family of standards.

The standards and protocols used by the communications interface 36 to communicate voice and data via the networks 12 and 22 are well known. Therefore, the specific details about the standards and protocols are not explicitly discussed herein. It is sufficient to say that, according to one embodiment of the present invention, the communications interface 36 is configured to download the programs 40, 42, and 44 from the servers 14, 16, and communicate with the central server 16 to facilitate the diagnosis and repair of computer 24. In one embodiment, which is seen in more detail later, the communications interface 36 is configured to further exchange the commands and data with a peer cellular device that can help the user of client device 20 to perform the diagnostic and/or repair functions on the computer 20.

Memory 38 is a computer readable medium representing the entire hierarchy of memory in client device 20, and may comprise both random access memory (RAM) and read-only memory (ROM). Memory 38 may be implemented in any manner known in the art including, for example, as one or more discrete devices, stacked devices, or removable devices, such as a flash drive or memory stick, or integrated with controller 30. As stated previously, the computer program instructions and data required for operation of the client device 20 are stored in non-volatile memory, such as EPROM, EEPROM, and/or flash memory. However, the application programs 40, 42, 44 that are utilized in the diagnosis and repair of the computer 24 are stored in volatile memory.

Storing the application programs 40, 42, 44 in volatile memory allows the controller 30 to permanently delete or remove the application programs 40, 42, 44 once the diagnosis and repairs to computer 24 are complete. Such actions support an embodiment of the present invention in which the user purchases only a limited license to utilize the application programs 40, 42, 44. Thereafter, if the user wishes to diagnose and repair another problem with computer 24, the user would have to once again purchase and download the application programs 40, 42, 44 from server 14.

The control program 40, the messaging program 42, and the diagnostic and repair programs 44 each perform different functions. Specifically, the diagnostic and repair programs 44 comprise one or more script files that will execute on the computer 24. Generally, the diagnostic and repair programs 44 contain the files and data that are needed for troubleshooting and repairing a variety of different hardware and software issues on computer 24. By way of example, the diagnostics and repair programs 44 may include executable script files that, inter alia, diagnose and effect repairs to the startup scripts and registry of computer 24, the hard drive of computer 24, repair and/or reinstall the operating system (OS) on computer 24, clean the OS, detect and remove a virus on computer 24, repair/install/uninstall different software applications on computer 24, and defragment a hard drive on computer 24. The diagnostic and repair programs 44 may also include executable script files that determine a current performance of computer 24, optimize that performance, and boot computer 24 into a variety of different operating modes, such as a "safe mode."

In addition to these diagnostics and repair routines, the diagnostic and repair programs 44 may also include one or more program files that, when executed, help to configure computer 24 to execute the diagnostic and repair functions. For example, in one embodiment, the diagnostic and repair programs 44 also include an emulator agent that that is copied to, and executes on, the computer 24. The emulator agent enables data communications between the client device 20 and the computer 24 via the USB cable 26.

More specifically, the emulator agent is a software module that is copied to the computer 24 along with the diagnostics and repair programs 44. Upon being installed and activated on computer 24, the emulator agent automatically configures the computer 24 to emulate a cellular communications device. So configured, the control program 40 executing on client device 20 can send commands to the emulator agent via a pre-defined port on the computer 24. Upon receipt, the emulator agent passes the commands to a command shell on the computer 24, which then executes the commands. The commands may cause, for example, the computer 24 to execute selected diagnostic and repair programs 44 previously installed on computer 24. The results are then provided to the client device 20 via the emulator agent for analysis by the user.

The control program 40 remains on the client device 20 to be executed by controller 30. As previously stated, the control program 40 is responsible for installing the diagnostic and repair programs 44 onto the computer 24 via the USB cable 26. In one embodiment, for example, computer 24 detects when the client device 20 connects to a USB port. In response, the computer 24 mounts the client device 20 as a removable external storage device. The process by which the computer 24 detects and mounts the client device 20 as a removable storage device is well known, and thus, not described in detail here. So mounted, the controller 30 transfers the diagnostic and repair programs 44, including the emulator agent and the command shell, from the memory 38 on client device 20 to one or more pre-determined directories on the computer 24.

The messaging program 42 also remains resident on the client device 20, and is responsible for sending and receiving text messages with the server 16. More specifically, the client device 20 communicates data and other parameters to the server 16, as well as the results of the diagnostic and repair programs 44. Once at the server 16, they are logged in DB 18 for further reference and analysis.

In one embodiment, which is described in more detail later, the messaging program 42 receives commands from a peer device specifically selected to assist the user in performing the diagnostic and repair functions. Particularly, the peer device embeds commands to execute selected diagnostic and repair programs 44 in text messages, and sends the messages to the messaging program 42 executing on client device 20. Upon receipt of the messages, the messaging program 42 sends the commands to the control program 40, which in turn, sends the commands to the emulator agent to launch the diagnostic and repair programs 44 stored on the computer 24 as previously described.

FIG. 3 is a perspective view of a client device 20 configured to operate according to one embodiment of the present invention. Particularly, FIG. 3 illustrates a GUI 48 that is presented to the user by the control program 40 in one embodiment of the present invention. Via GUI 48, the user of client device 20 can perform a variety of functions to control computer 24 to execute selected diagnostic and repair programs 44.

As seen in FIG. 3, the GUI 48 provides a plurality of different touch-sensitive controls 48a-48f. Each control 48a-48f, when selected by the user, causes controller 30 to generate a command or message associated with performing a different function. By way of example, control 48a generates a request message that is sent to server 16. The request is for a peer technician that could assist the user in performing the diagnostic and repair tasks. The server 16, in response, sends the client device 20 a list of peer devices that are available to assist the user in performing the diagnostic and repair functions. The GUI 48 displays the list for the user so that the user can select, and connect to, one of the available peer devices.

Control 48b allows the user to begin a diagnostic program on the computer 24. For example, in one embodiment, actuating control 48b generates a command that is sent to the emulator agent. Upon receipt, the computer 24 executes one or more of the diagnostics and repair programs 44 that are responsible for detecting and reporting the current hardware and software settings of computer 24. In another embodiment, actuating control 48b generates a command that instantiates or activates a particular application program on computer 24, such as the emulator agent, so that the client device 20 can subsequently control the computer 24. Control 48c will launch a messaging interface, seen in more detail later, to allow the user of client device 20 to communicate text messages with the peer technician associated with the selected peer device. In one embodiment, for example, actuating control 48c causes the controller 30 to send a request message to server 16 to establish a communication link. The request message includes one or more parameters such as the identity of the selected peer device, as well as the serial number and model number of the computer 24. Upon the establishment of the link, the user can enter text into the text field 50 to send to the peer device.

The remaining controls allow the user to perform other functions. For example, actuating control 48d invokes a Frequently Asked Questions (FAQ) that may provide assistance to the user performing the diagnostic and repair functions on computer 24, while actuating control 48e allows the user to view reports regarding the diagnostics and repair functions on computer 24. Actuating control 48f allows the user to view a current status of a particular diagnostic or repair function. In each case, the control program 40 generates a command or message that is sent to computer 24 or server 16 to retrieve the results and/or status for display on the touch-sensitive display 46.

Figure 4:
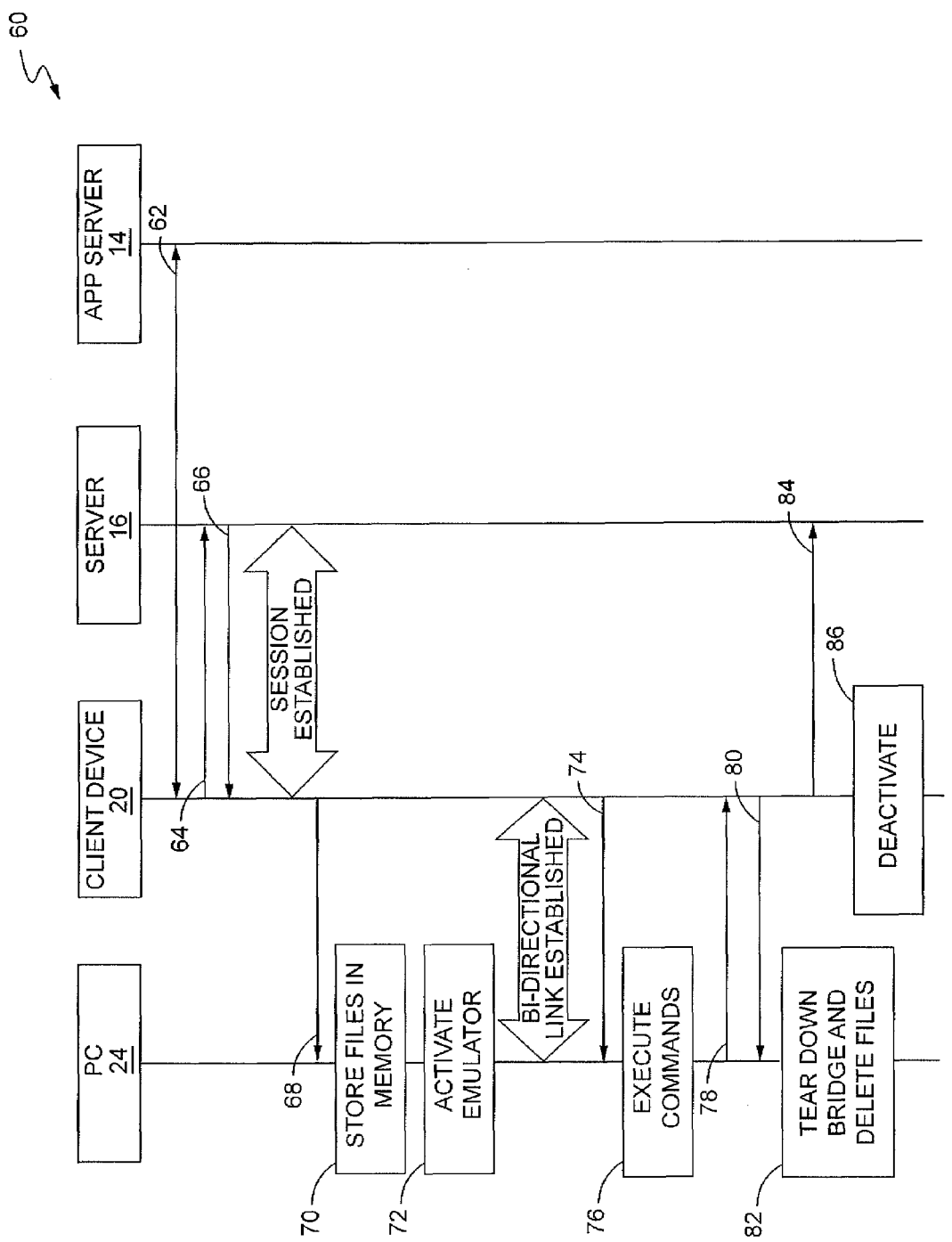
FIG. 4 is a signal diagram that illustrates how a client cellular communications device could perform diagnostic and/or repair functions on a computing device according to one embodiment of the present invention.

FIG. 4 is a signal diagram 60 that illustrates a method by which the client device 20 may control the computer 24 to perform the diagnostic and repair functions. As previously described, the client device 20 communicatively connects to the computer 24 directly using a USB cable 26.

The method begins with the client device 20 sending a message to the application server 14 to download the application programs 40, 42, 44 (line 62). The application servers 14 may be, for example, one or more servers that distribute application programs to client cellular devices upon the payment of a fee. In one embodiment, for example, the application servers 14 represent servers such as those operated by APPLE or GOOGLE or some other entity for downloading mobile applications from an application store to cellular telephones.

Once downloaded, the client device 20 generates and sends a registration request message to the server 16 (line 64). The registration request message includes parameters that uniquely identify the client device 20, such as the Mobile Equipment Identifier (MEI) of client device 20, for example, as well as the application programs 40, 42, and 44 that were downloaded to the client device 20. The parameters allow the server 16 to establish a communication session with the client device 20, and to start a logging function to record the results of the diagnostics and repair programs 44 in DB 18. In response to the registration request, the server 16 returns an acknowledgement message to the client device 20 indicating that logging has started and that the session is established (line 66).

To execute the diagnostic and repair functions on computer 24, the client device 20 connects to a USB port on the computer 24 using USB cable 26, as previously described. Once connected, an autorun program executing on the computer 24 will detect and mount the client device 20 as a removable storage device. The autorun command also copies the diagnostics and repair programs 44, including the emulator agent and, if needed, the command shell, from the client device 20 to the computer 24 (line 68) for storage in a predetermined directory (box 70). Additionally, the emulator agent is automatically activated on computer 24 to execute a routine that reconfigures selected settings on the computer 24 to place the computer 24 from a current operating mode into a diagnostics mode (box 72).

For example, in one embodiment, the emulator agent contains code and instructions that are automatically executed by the autorun feature. Particularly, the emulator agent creates and opens one or more port connections on computer 24 to allow the control application 40 executing on the client device 20 to send and receive data with computer 24. The emulator agent also modifies the port parameters on the computer 24, edits a registry to temporarily bypass the current security permissions, changes firewall parameters, if a firewall exists, and checks for and installs the command shell if one is needed. Once the computer 24 is in the diagnostics mode, a bi-directional communications link is established between the client device 20 and the computer 24 to allow the two devices to send and receive data with each other, such as commands to execute functions, status data, and report data.

Once the emulator agent is activated, the control program 40 sends a command to begin executing a selected diagnostic function (line 74). Upon receipt of the command at computer 24, the emulator agent passes the command to the command shell for execution (box 76). The results of the executing program are then passed back to client device 20, which may record them in local memory 38 (line 78). As stated previously, the client device 20 also passes the results to the server 16 for logging in the DB 18 (line 78).

This process of sending commands and reporting results (i.e., line 74-line 78) may continue until the issues with the computer 24 are fixed. Once fixed, however, the control program 40 on client device 20 automatically sends a termination message to the computer 24 (line 80). The emulator agent, upon receipt of the termination message, resets the configuration settings on the computer 24 to desired values to place the computer 24 into a normal operating mode and tears down the communications bridge between the emulator agent and the client device 20. The emulator agent also generates commands to permanently delete all the diagnostic and repair programs 44 from the predetermined directory on computer 24 (box 82). The client device 20 then notifies the server 16 of the termination and sends any remaining information to the server 16 for logging (line 84) before deactivating or terminating its execution on client device 20 (box 86). Once deactivated, a user cannot use the application programs 40, 42, 44 to perform diagnostics and repair functions on computer 24. A user faced with another issue on computer 24 would need to purchase another limited license for application programs 40, 42, 44, or once again download the application programs 40, 42, 44 from the server 14.

The previous embodiment allows a user to perform diagnostic and repair functions utilizing his or her cellular communication device. However, the present invention is not so limited. Particularly, there are situations in which the user of client device 20 lacks the skill or knowledge required to perform the diagnostics and repair functions, or to analyze and act on the reported results. Therefore, another aspect of the present invention is to create a global network of peer technicians that are able to diagnose and repair a user's computing device from a remote location.

More particularly, knowledgeable or technically savvy individuals owning a Smartphone configured according to one embodiment of the present invention can register as a peer technician with the control server 16. Peer technicians may be contacted by the users of the client devices 20, or by the server 16 on behalf of the users, and asked to run the diagnostics and repair functions for the user. To accomplish this, the peer technicians have an application executing on their Smartphone that allows them to connect to and generally control the user's client device to execute selected diagnostics and repair programs 44. This embodiment is useful, for example, in situations where the user of client device 20 lacks the knowledge or technical skills to be able to perform the diagnostics and repair procedures alone.

Figure 5:
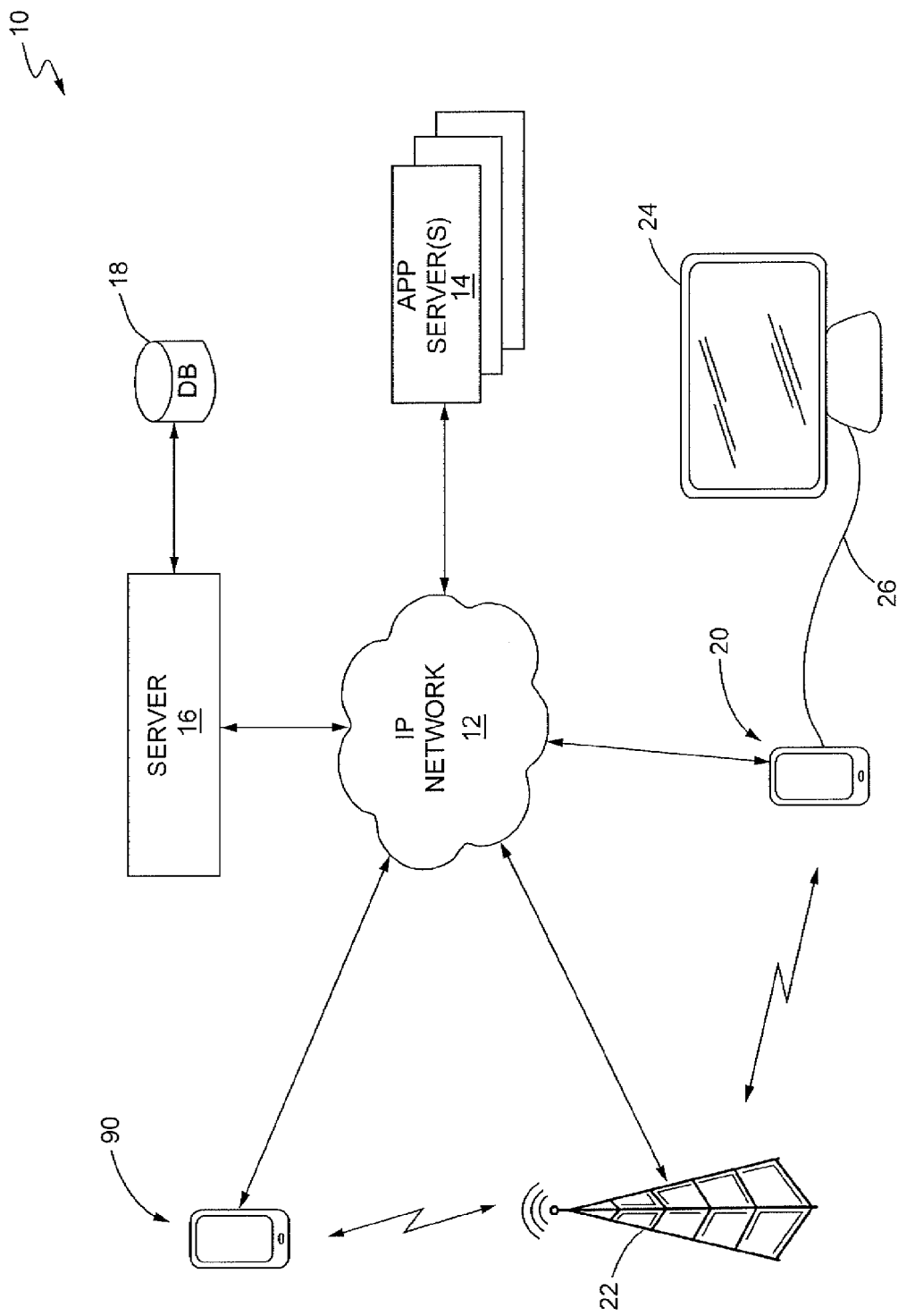
FIG. 5 is a block diagram of a communications system configured according to another embodiment of the present invention.

FIG. 5 illustrates system 10 configured according to such an embodiment of the present invention. As seen in FIG. 5, system 10 comprises the same components as those described previously in FIG. 1. However, in addition to those components, this embodiment of the invention also provides a peer device 90 configured to assist the user of client device 20 in performing the diagnostics and repair functions on the user's computer 20. Particularly, the peer device 90 is able to communicate with the servers 14, 16 and the client device 12 via the IP network 12. Additionally, peer device 90 is also a fully functional cellular communications device, and therefore, can communicate with the client device 20 and other cellular devices via the cellular network 24. Via one or both of these networks 12, 24, peer device 90 sends commands embedded in text messages, for example, to the client device 20 to control computer 24 to execute selected diagnostics and repair functions. The peer device 90 also receives status reports from the client device 20 and/or server 16 via these networks indicating the results of the diagnostics and repair functions. Based on an analysis of these reports, the peer technician associated with the peer device 90 can determine whether to remotely command the client device 20 to run additional diagnostics and/or repair programs on computer 24.

Figure 6:
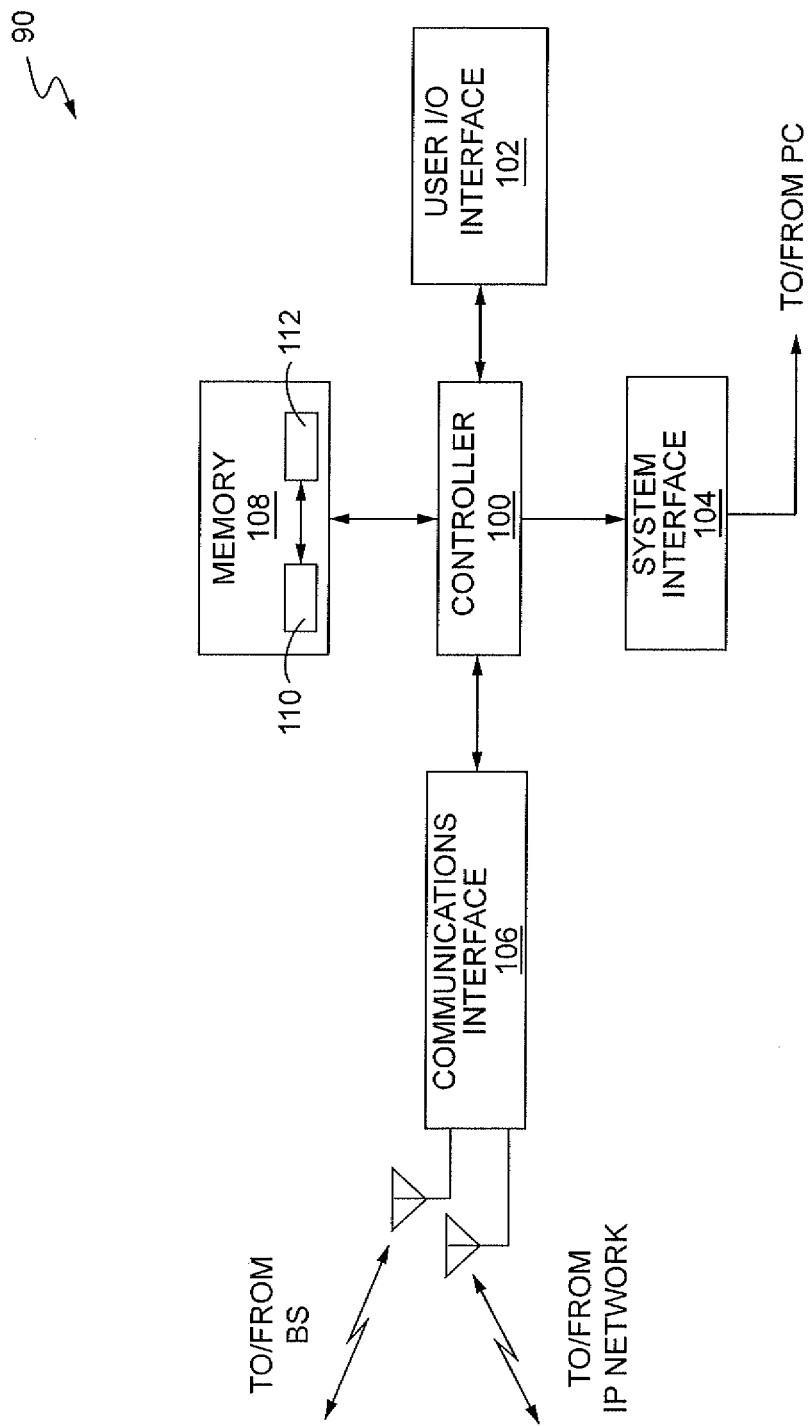
FIG. 6 is a block diagram illustrating some components of a peer cellular communications device configured according to one embodiment of the present invention.

FIG. 6 is a block diagram illustrating some of the components of a peer device 90. As is seen in FIG. 6, the peer device 90 and the client device 20 are both cellular communication devices. Therefore, peer device 90 comprises many of the same components as client device 20. These include a controller 100, a user I/O interface 102, a system interface 104, a communications interface 106, and a memory 108. These components function similarly to those described with respect to the client device 20, and thus, are not further described here. However, peer device 90 does include software that is executed by the controller 100 that is not found on the client device 20. As seen in FIG. 6, the software includes technician application program 110 and a messaging program 112.

The technician program 110 provides the peer technician with a GUI that allows the peer technician to generate and send commands for computer 24 to client device 20. The technician program 110 also allows the peer technician to perform other related functions, such as set the availability status of the peer technician at the server 16 and request and view status reports. The messaging program 112 operates in much the same way as the messaging program 42 on client device 20. Particularly, the messaging program 112 provides the peer technician with the ability to send and receive text messages with the user of client device 20 via the messaging program 42.

Figure 7:
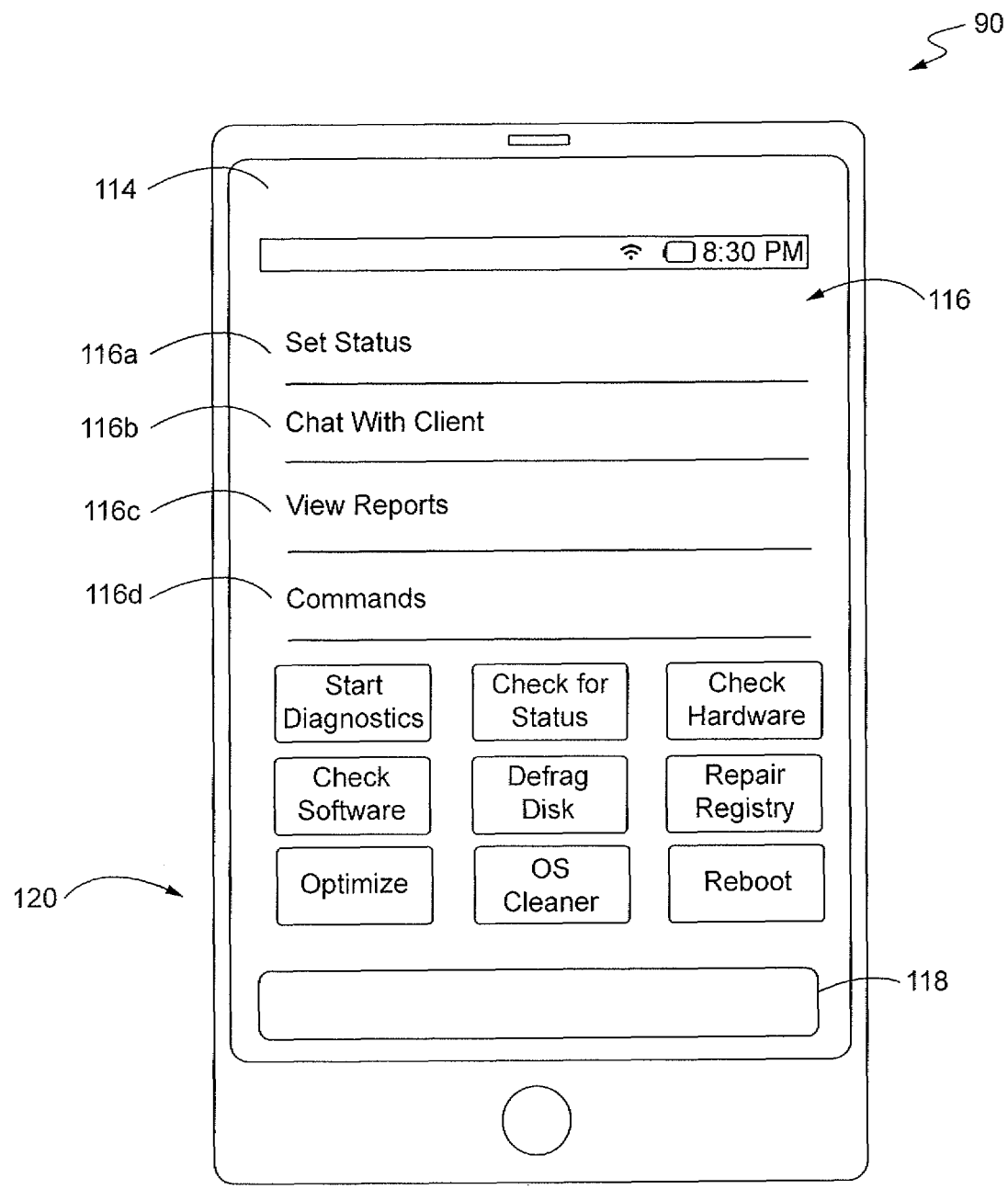
FIG. 7 is a perspective view of a GUI on a peer cellular communications device Configured to remotely diagnose and/or repair a computing device according to one embodiment of the present invention.

FIG. 7 illustrates the GUI 116 displayed on touch-sensitive display 114 of the peer device 90 according to one embodiment of the present invention. A plurality of controls 116a-116d allows the peer technician to perform different functions. For example, when the peer technician contacts the "SET STATUS" control 116a, controller 100 generates and sends a status message to the control server 16 identifying the status of the peer technician as being either "AVAILABLE" or "UNAVAILABLE." An "AVAILABLE" status informs the server 16 that the peer technician may be contacted to provide assistance to a user of client device 20. An "UNAVAILABLE" status means that the peer technician is not available to assist the user of client device 20.

The "CHAT WITH CLIENT" control 116b establishes a chat session with the client device 20 and provides a corresponding chat window (seen in FIG. 10A) so that the peer technician can communicate with the user of client device 20 to perform certain functions or to ask/answer questions. For example, the peer technician may establish the chat session upon receiving a request for assistance from the user of client device 20, and send a text message asking the user to connect the client device 20 to the USB port on the computer 24 using the USB cable 26.

The control 116c allows the peer technician to download and view the reports that indicate the results of the diagnostics and repair programs. Based on an analysis of the data in these reports, the peer technician can determine a further course of action, and if appropriate, control the client device 20 to execute additional diagnostics and/or repair programs 44 on computer 24.

The "COMMANDS" control 116d provides the peer technician with an interface (seen in FIG. 10B) from which he or she can select one or more commands to send to client device 20. For example, the peer technician may be presented with a drop down list of commands from which to choose. Additionally, the peer technician can manually enter commands in a text field 118 using a keypad that appears when the peer technician selects the text field 118. A section of the touch-sensitive display 114 also includes a plurality of control buttons 120 that are specially pre-configured by the peer technician. Each control button 120 is associated with a predetermined action or function to be performed on the computer 24 and causes the controller 100 to generate and send a different command to client device 20.

Generally, the actions and functions that are associated with the control buttons 120 are those that are most often utilized by the peer technician. However, it should be noted that the specific actions and functions associated with those control buttons 120 are not the only functions and actions permitted by the peer device 90. In one embodiment, the number and arrangement of the control buttons 120, as well as their specific associated functions and actions (i.e., the commands they generate) is configurable by the peer technician.

In one embodiment, the commands that are generated and sent to the client device 20 by peer device 90 are embedded in text messages. More specifically, the technician program 110 generates text strings having a specific format for a desired command. The format may be any format needed or desired, but in one embodiment, the command strings have the following format.

$?$<COMMAND><PARAMETER 1 . . . PARAMETER n>$\?$

In this embodiment, the start of the text string is indicated using "$?$." This sequence of characters identifies the text string to the server 16, and to the client device 20, as a command string. After the start indicator, the text string includes a command and any parameters that are needed to execute the command on the computer 24. The end of the text string is indicated using "$\?$" to indicate to the server 16 and the client device 20 that the command string has ended.

The command string may be embedded into any desired portion of the text message, such as the header of the text message or the body of the text message. Regardless of its placement in the message, the predefined format allows the client device 20 receiving the text message to parse and extract the commands, as well as any associated parameters, for use in controlling the operation of the computer 24. It also allows the server 16 to parse and extract the commands and any associated parameters for logging.

Generally, the technician application program 110 generates the commands responsive to input by the peer technician, and then sends them to the messaging program 112. The messaging program 112 then formats the commands in a text message for transmission to the messaging program 42 on the client device 20. Upon receipt, the messaging program 42 extracts the commands and parameters, and passes those to the control program 40. The control program 40 then generates the commands in a format required by the command shell executing on the computer 24 and sends them to the command shell via the emulator agent. The results are then passed back to the server 16 and the peer device 90 via the client device 20.

Figure 8B:
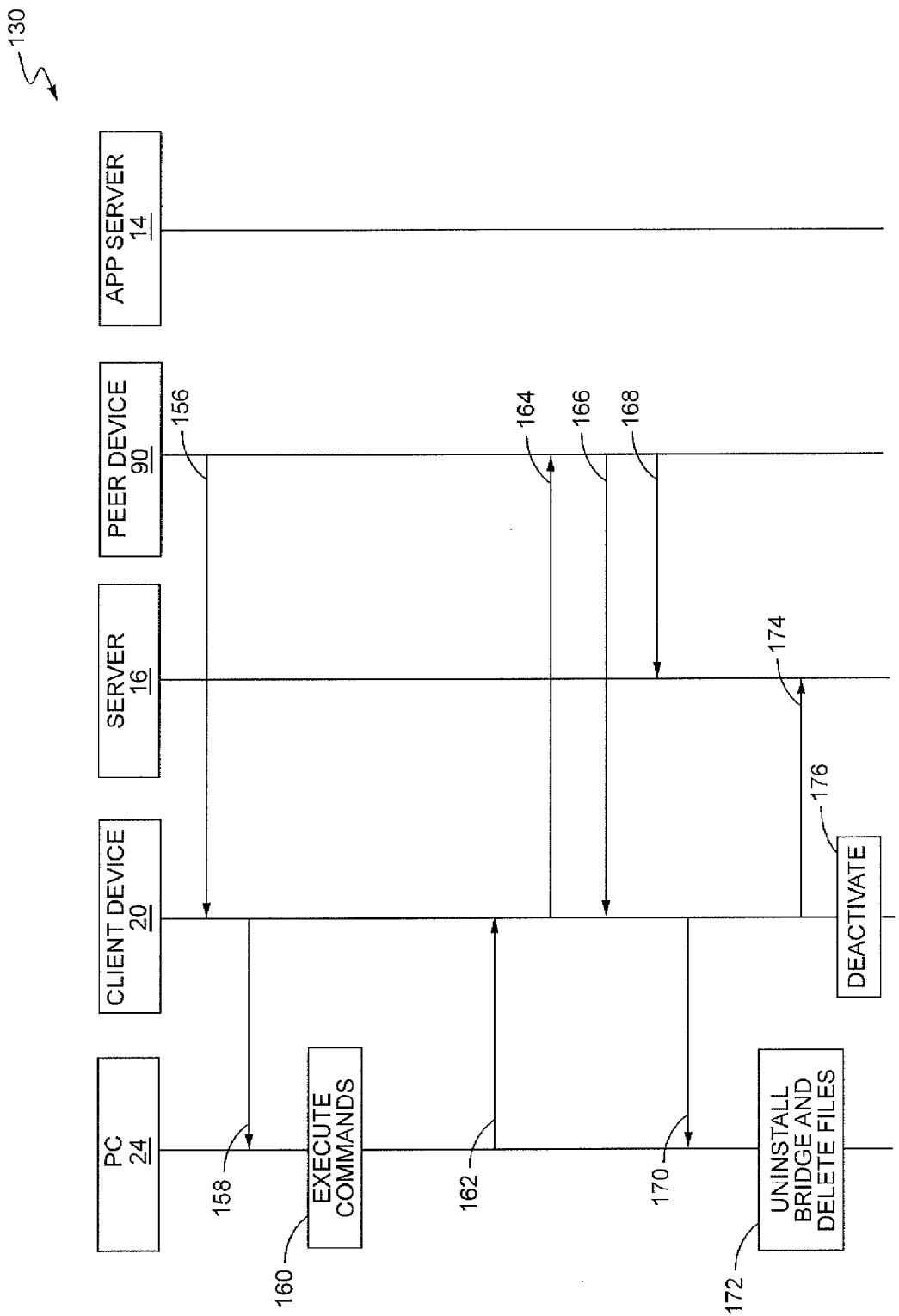

FIGS. 8A-8B show a signaling diagram that illustrates a method 130 by which the peer device 90 can control the client device 20 to perform the diagnostics and repair functions on the computer 24 according to one embodiment of the present invention. The method 130 begins on FIG. 8A with the peer device 90 receiving the technician program 110 and the messaging program 112 from the application server 14 (line 132). As stated previously, the application servers 14 represent servers or nodes operated by APPLE or GOOGLE or some other entity for downloading mobile applications to cellular telephones. Upon receiving and installing the programs 110, 112, the peer device 90 generates and sends a registration request message to the server 16 to register the technician with the server 16 (line 134). The registration request message sent by the peer device 90 may include any information and data needed or desired by the server 14, but in one embodiment, includes the MEI of the peer device 90, the name of the peer technician, a unique account identifier for the peer technician, and the phone number of the peer device 90. This information may be retained at the server 16 so that the peer technician can receive points, for example, as a reward for performing the technician functions. Once the peer device 90 is registered at the server 16, the peer device 90 sends a status update to indicate whether the peer technician is "AVAILABLE" or "UNAVAILABLE" (line 136). In response, the server 16 may send an acknowledgment message to the peer device 90 (line 138).

As stated previously, the client device 20 also purchases a limited license for the application programs 40, 42, and 44, and downloads those programs from the application server 14 (line 140). Once the application programs 40, 42, 44 are downloaded, the client device 20 installs the control program 40 and the messaging program 42, and then stores the diagnostics and repair programs 44 to memory 38. The client device 20 then generates and sends a registration request message to the server 16 (line 142) and receives an acknowledgment message in return from server 16 (line 144).

In this embodiment, the registration request message sent by client device 20 also indicates that the client device 20 requests assistance from a peer device 90. As previously stated, the server 16 maintains a list of peer technicians that are "AVAILABLE." Thus, responsive to receiving the registration request from the client device 20, the server 16 also selects an available technician from the list for the user and sends a notification message to the selected peer device 90 (line 146). The notification message may be, for example, a text message that indicates the type of request to the peer technician (e.g., help with installing a software package or removing a virus from computer 24), as well as identifies the client device 20. The peer technician can acknowledge the notification by actuating a control on the GUI 116, for example. In response, the server 16 generates and sends a text message to the messaging program 42 executing on client device 20 (line 148). The message sent to the client device 20 identifies the peer technician to the user. The server 16 also retrieves data from the DB 18 associated with each of the user and the peer technician, and establishes a messaging link between the client device 20 and the peer device 90. The link allows the messaging programs 42, 112 on each of the client and peer devices 20, 90, to send and receive messages back and forth to each other.

For example, the peer technician may send a text message to the client device 20 to instruct the user to connect the client device 20 to the computer 24 using the USB cable 26. Upon connecting the client device 20, the computer 24 would execute its autorun command and mount the client device 20 as a removable storage device. As stated previously, this action would cause the client device 20 to transfer the diagnostic and repair programs 44, which include the emulator agent and, if needed, the command shell, to the computer 24 (line 150). Upon receipt, the computer 24 stores the programs 44 in memory (box 152) and installs the emulator agent to activate the communications bridge that facilitates the communication of the commands and the reports between the client device 20 and the computer 24 (box 154).

Activating the emulator agent on the computer 24 establishes a communications channel between the peer device 90 and the computer 24 via the client device 20. As stated previously, the activation also re-configures selected settings on the computer 24 such that the computer 24 moves from a current operating mode to a diagnostics mode. In this mode, the peer technician can use the peer device 90 to generate and send appropriate commands to the client device 20 to control computer 24 to execute selected diagnostic and repair programs 44, and to report their results.

For example, the peer technician may actuate one of the control buttons 120 to start a diagnostics procedure on computer 24. In response, the technician program 110 generates the appropriate command and sends the command to the messaging program 112. As seen in FIG. 8B, the messaging program 112 then embeds the command in a text message and sends the text message via server 16 to the messaging program 42 executing on the client device (line 156). Upon receiving the text message, the messaging program 42 extracts the command and associated parameters, and provides them to the control program 40. The control program 40 then sends the commands to the emulator agent on computer 24 (line 156), which then passes them to the command shell for execution (line 158). The computer executes the appropriate diagnostics function (box 160) and returns the results to the client device 20 via the USB cable 26 (line 162). The results may indicate, for example, the current settings of a piece of hardware or software associated with the computer 24, or indicates whether the computer 24 is infected with a virus. Of course, these are only examples of the types of functions that may be performed by computer 24 responsive to the commands sent by peer device 90. Other diagnostic functions, as well as a variety of different repair functions (e.g., virus removal), are also possible.

Once the client device 20 receives the results, the control program 40 sends them in a report to the peer device 90 (line 164). As stated above, the server 16 may parse the messages and log the data in DB 18. Upon receipt of the results, the peer technician analyzes the results and determines an appropriate course of action. For example, if the peer technician determines that additional diagnostics and/or repairs are needed, the peer technician simply repeats the process of controlling peer device 90 to generate and send the appropriate commands and parameters to the client device 20, and receives the results for analysis (line 156-164).

This process may continue until the problem is fixed. Upon determining that the problem is fixed, the peer technician controls the peer device 90 to generate and send a termination command to the client device 20 (line 166). The peer device 90 also generates and sends the command to the server 16 to inform the server 16 that the problem is fixed (line 168). The client device 20, upon receipt of the termination command, sends the command to the emulator agent on computer 24 (line 170). The emulator agent then sets configuration settings on the computer 24 to desired values to place the computer 24 into a normal operating mode, tears down the communications bridge between the agent and the client device 20, and permanently deletes the diagnostic and repair programs 44 from the predetermined directory on computer 24 (box 172). The client device 20 then notifies the server 16 of the termination and sends any remaining information or data to the server 16 for logging (line 174) before being deactivated on client device 20 (box 176).

As stated above, the user cannot use the application programs 40, 42, 44 to perform additional diagnostic and repair functions once the client device 20 has deactivated the application programs 40, 42, 44. Therefore, a user faced with another issue on computer 24 would need to once again purchase another limited license for application programs 40, 42, 44. The peer technician, however, is not so constrained. According to the present invention, the technician program 100 and messaging program 112 remain on the peer device 90 and activated so that the peer technician can assist other users.

In the previous embodiment, the peer technicians provide the server 16 with data indicating whether they are AVAILABLE to assist a user of client device 20 or UNAVAILABLE to assist the user. Additionally, the server 16 automatically selects a peer technician for the user of client device 20 and sends the user the identity of the selected peer device 90. In another embodiment, however, seen in FIG. 9, the user selects a technician at the client device 20, rather than the server 16 performing this function.

Figure 9:
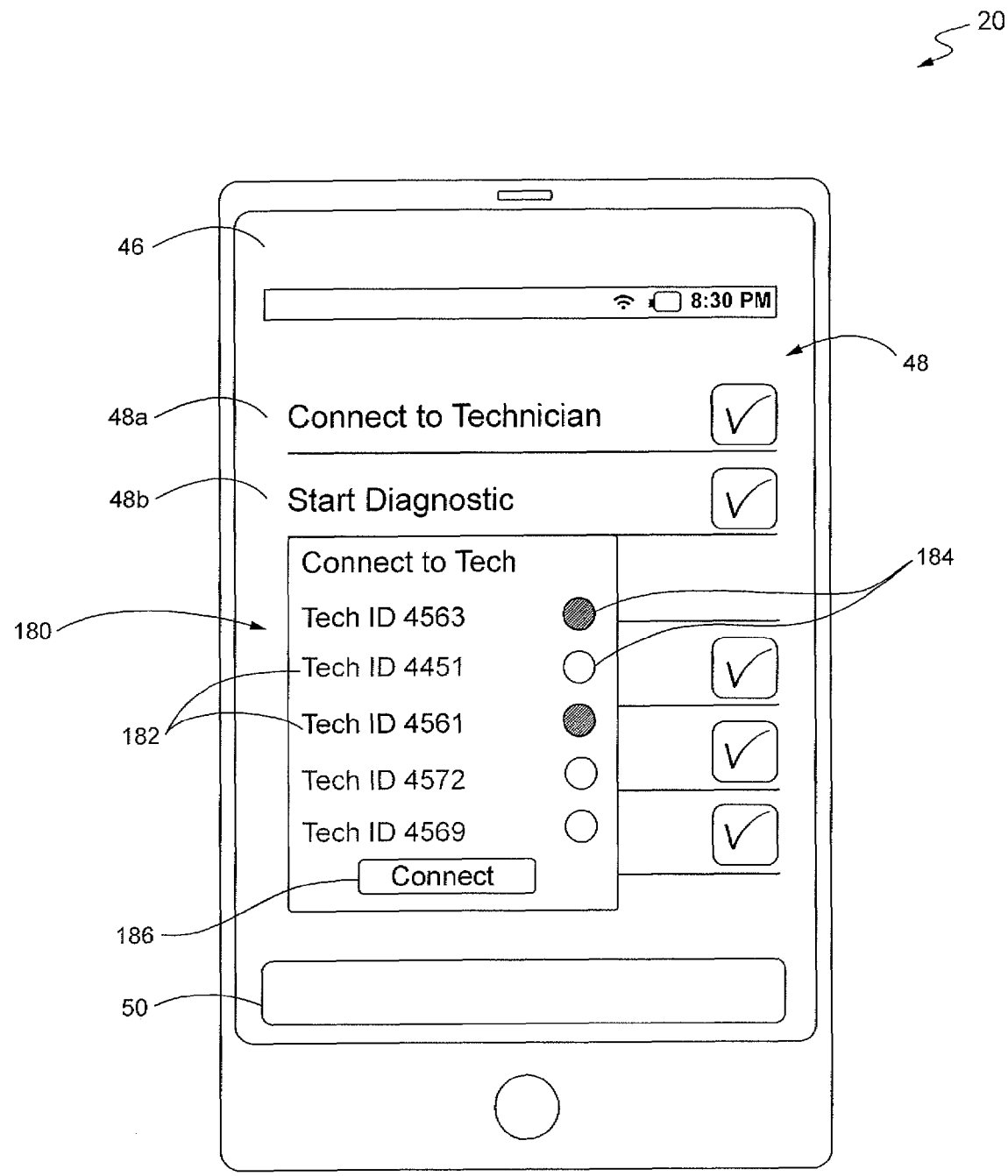
FIG. 9 is a perspective view illustrating a GUI on a client cellular communications device configured to diagnose and/or repair a computing device according to another embodiment of the present invention.

More particularly, the server 16 monitors the availability of the peer technicians. Upon receiving a request message from the client device, the server 16 provides the client device 20 with a list of peer devices. As seen in FIG. 9, the client device 20 presents this list in a pop-up window 180 on the touch-sensitive display 46. The window 180 displays a label 182 identifying each technician and a graphical indicator 184 that visually indicates the availability status of each peer technician. In this embodiment, those technicians having an indicator 184 that is highlighted or otherwise marked are AVAILABLE. Those having indicators 184 that are not highlighted or otherwise marked are UNAVAILABLE. In one embodiment, the labels 182 associated with those peer technicians that are indicated as being UNAVAILABLE are also grayed.

To select a given peer technician, the user of client device 20 need only touch the corresponding label 182 of an AVAILABLE peer technician and then touch the "CONNECT" control 186. Responsive to this action, the control program 40 generates a request message with the identity of the selected peer technician and sends it to server 16 via the messaging program 42. Upon receipt, the server 16 contacts the selected technician and establishes the communication link between the client and peer devices 20, 90 as previously described. Once the link is established, the client device 20 and the peer device 90 can communicate with each other using text messages that are sent and received by their respective messaging programs 42, 112.

Figure 10A:
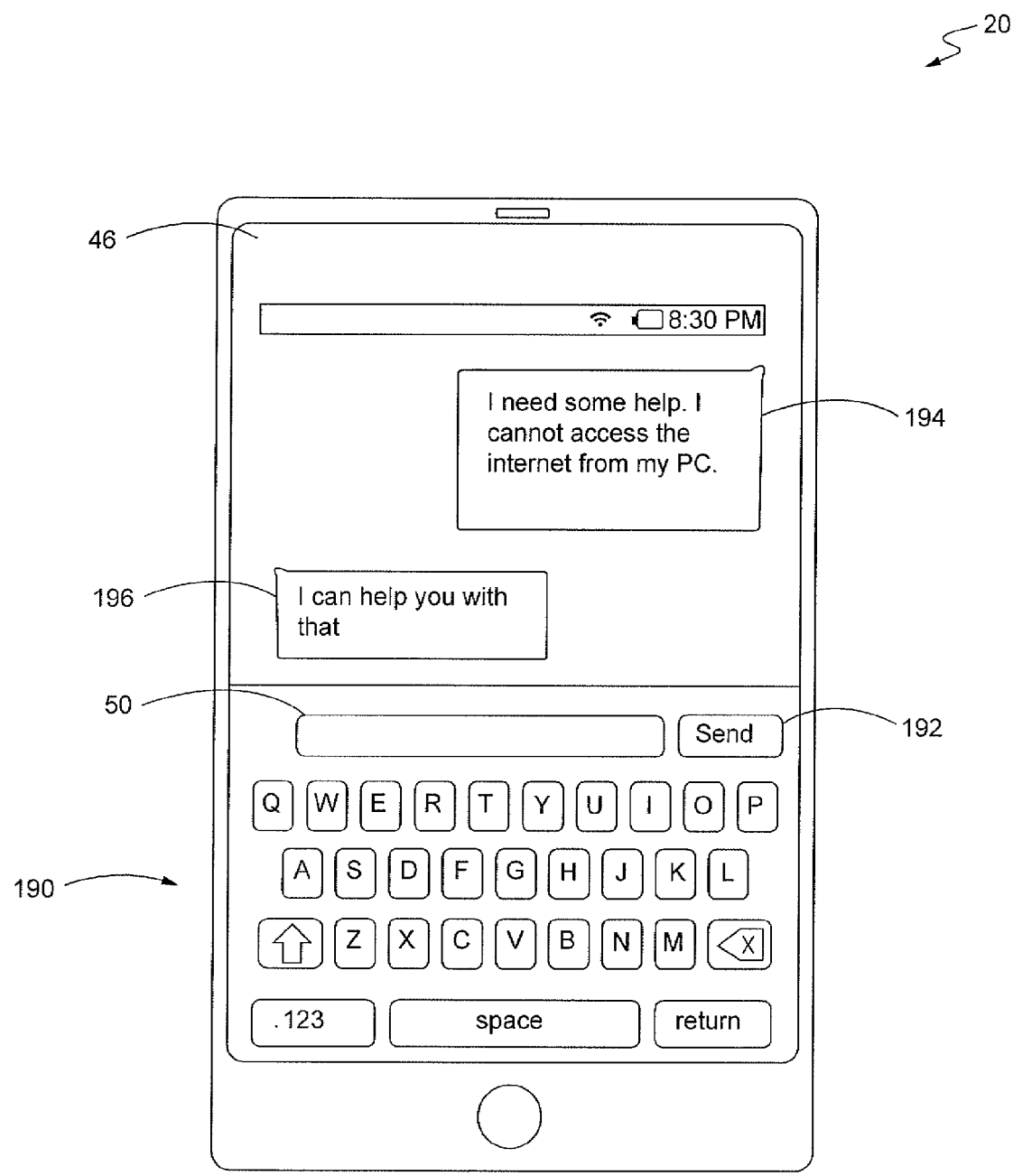
FIG. 10A is a perspective view illustrating the GUI of a client cellular communications device that allows a user to communicate text messages with a peer cellular communications device according to one embodiment of the present invention.

FIG. 10A illustrates the GUI 46 of a client device 20 as it might appear when communicating with the peer technician. Although FIG. 10A illustrates the client device 20, the peer device 90 has similar functionality, and thus, would appear to the peer technician in much the same way. As seen in FIG. 10A, the GUI 46 presents the user with a text message input screen. The screen includes an alpha-numeric keypad 190, the text entry field 50, and a SEND control 192 to send text messages to the peer device 90. The messages that the user sends and receives 194, 196 are also displayed as is known in the art.

Figure 10B:
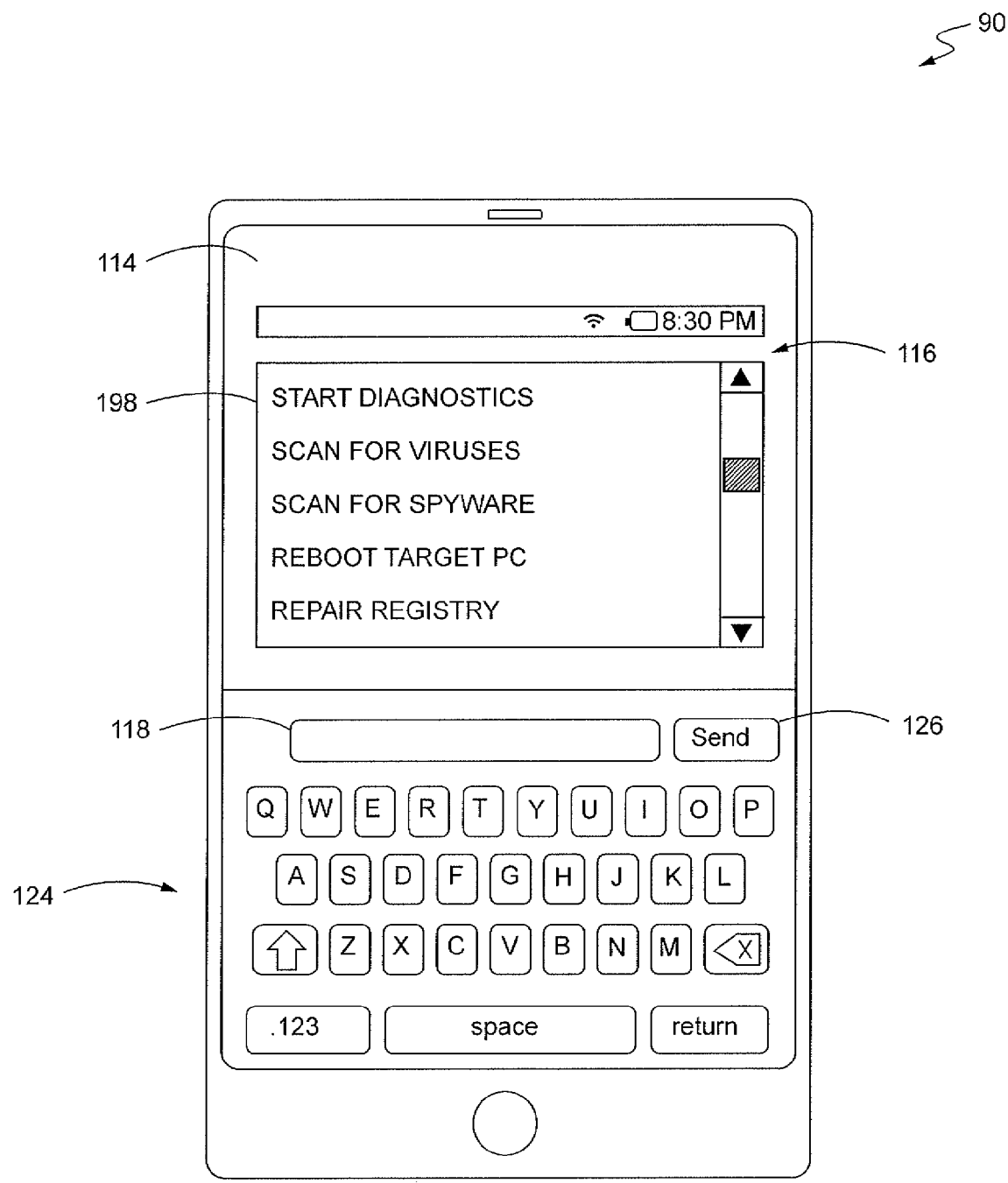
FIG. 10B is a perspective view illustrating the GUI of a peer cellular communications device that allows a technician to select commands to send to the client device according to one embodiment of the present invention.

FIG. 10B illustrates the GUI 116 on peer device 90 as it might appear when the peer technician invokes the "COMMANDS" control 116d (seen in FIG. 7). In this embodiment, the GUI 116 of peer device 90 provides the peer technician with a graphical, touch-sensitive interface from which the peer technician can select commands to send to the client device 20. Particularly, a drop down list 198 appears on the touch-sensitive display 114 identifying the different commands that the peer technician may send to the client device 20. To select a desired command, the peer technician would simply touch the desired command in the list. The commands in the drop down list 198 may contain the commands associated with the technician-configured control buttons 120 (seen in FIG. 7), as well as other commands.

Additionally, the peer technician is also presented with a keypad 124 with which to manually enter commands and/or parameters into text field 118. The command string entered by the peer technician may, as previously described, include a start tag (e.g., $?$") followed by a command and one or more parameters, and end with an end tag ("\$/?$) to indicate the start and end of the command string to the server 16 and the client device 20. Once entered, the peer technician sends the commands to the client device by touching the "SEND" button 126.

Figure 11:
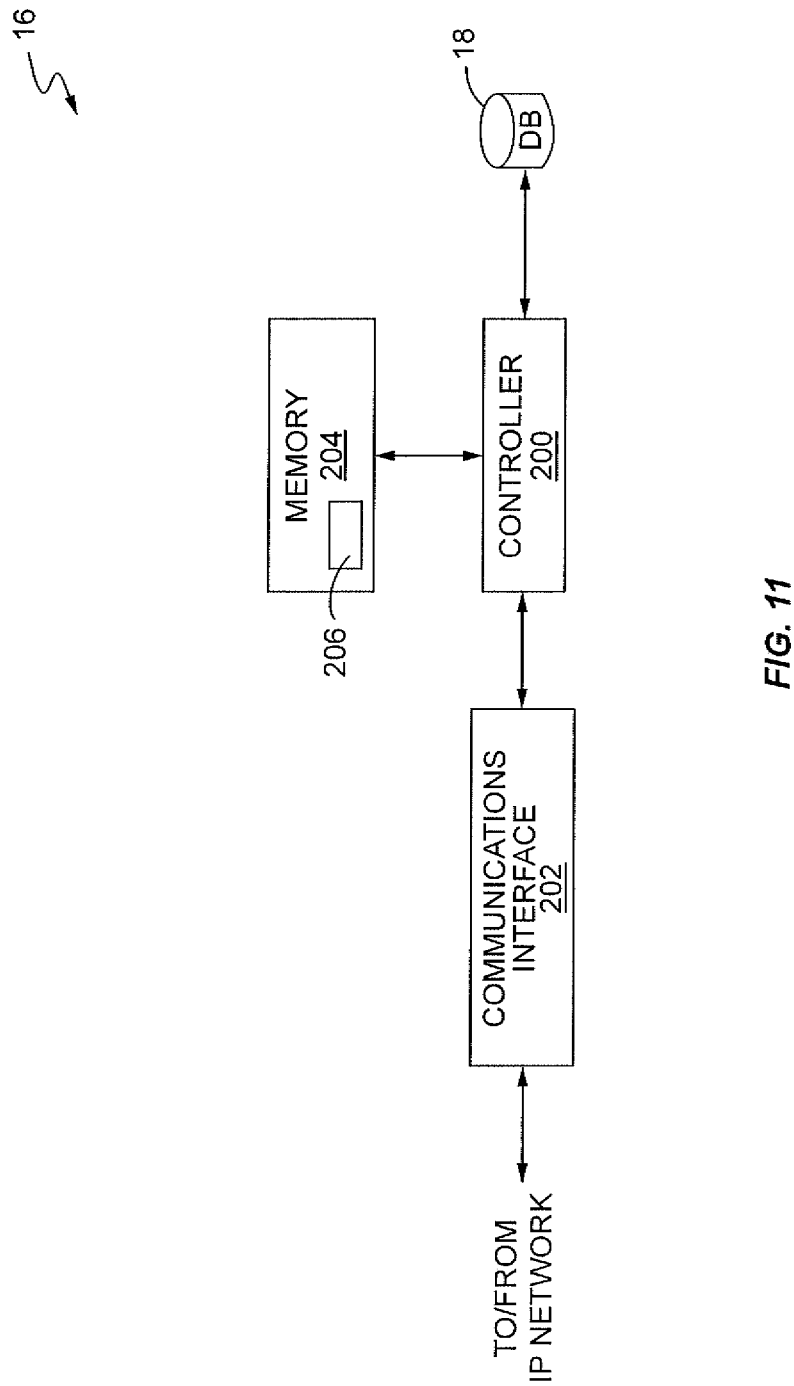
FIG. 11 is a block diagram that illustrates some of the components of a server configured to operate according to one embodiment of the present invention.

FIG. 11 is a block diagram illustrating some component parts of a server 16 configured according to one embodiment of the present invention. As seen in FIG. 11, the server 16 comprises a programmable controller 200, a communications interface 202 communicative connected to the IP network 12, and a memory 204. The controller 200 typically comprises one or more programmable microprocessors that are programmed to control the operation of the server 16 according to one or more programs stored in memory 204. Such programs include, but are not limited to, those that control the ability of server 16 to establish communications links with user terminals, such as the client and peer devices 20 and 90, and communicating information in data packets over that link via the communications interface 202. In addition, however, controller 200 may also be configured to monitor the communications between the client and peer devices 20, 90, and log details of the diagnostic operations being performed by the client and/or peer devices 20, 90.

For example, in one embodiment, the server 16 includes one or more software modules 206 that, when executed by the controller 200, configure the server 16 to perform several functions that support the diagnostics and repair operations being performed on the computer 24. These functions include, but are not limited to, registering the client and peer devices 20, 90, logging the data and reports output by the diagnostics and repair programs 44 in DB 18, maintaining the status of the peer devices 90 as being either AVAILABLE or UNAVAILABLE, maintaining the connection states of the client and peer devices 20, 90, and establishing and controlling a communication link between the client and peer devices 20, 90 so that those devices can communicate commands and data in text messages.

The one or more software modules 206 may be designed and implemented using any language or technology desired. However, in one embodiment, the server modules 206 are Jabber-based server modules. As is known in the art, Jabber is a, open-source, secure technology that may be used to implement instant-messaging applications, such as the messaging programs 42 and 112 on the client and peer devices 20, 90, respectively. Using this technology, the messaging programs 42, 112 send text messages to the software modules 206.

Particularly, the client and peer devices 20, 90 register with the server 16. Thereafter, the text messages sent by the client and peer devices 20, 90 are addressed to the server 16 using a user name and domain name or IP address of the server 16. Further, the software modules 206 may, in one embodiment, allow users to specify a particular device associated with the user. Therefore, the text messages may be addressed to indicate a specific destination device for the messages, which according to the present invention is the user's cellular device. Thus, by way of example, the messaging program 112 on peer device 90 may send embedded commands in a text message addressed to the client (via the server 16) as "client@server_16.com/mobile." Upon receipt, the software modules 206 on server 16 may parse the text message to glean important data for logging on DB 18 before forwarding the message to the client device 20.

Figure 12A:
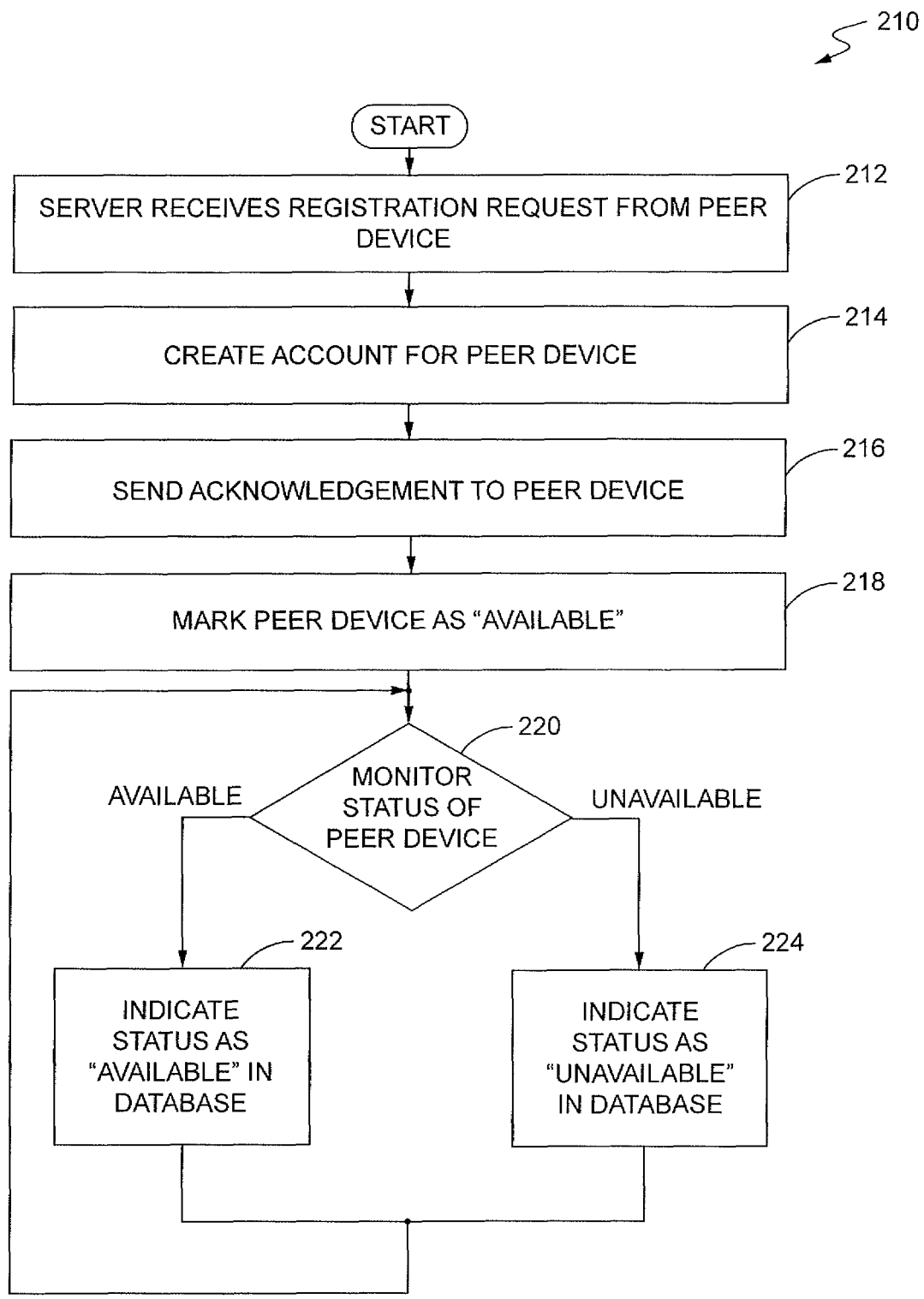
FIGS. 12A-12C are flow diagrams illustrating methods performed by the server according to one embodiment of the present invention.
Figure 12B:
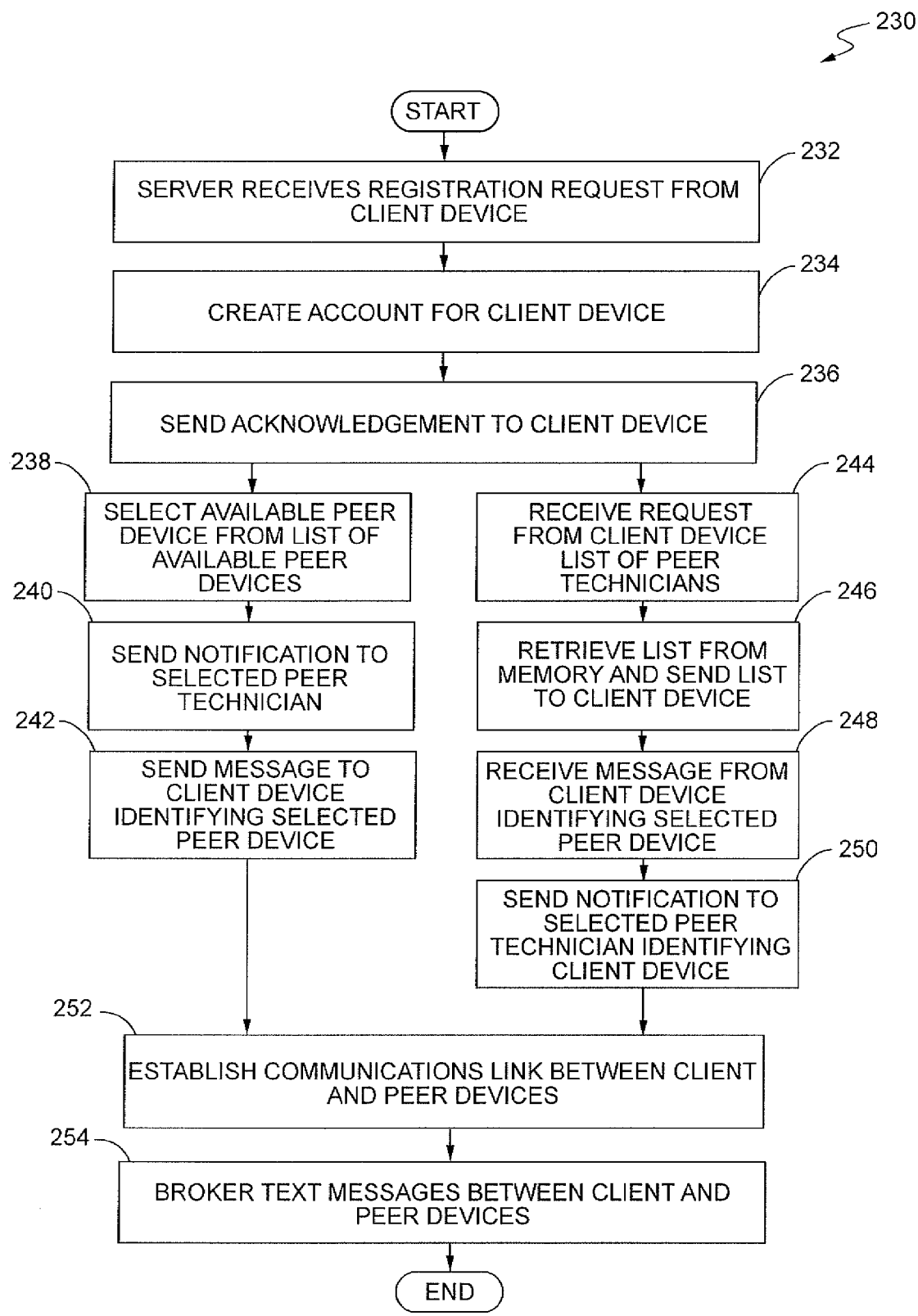
Figure 12C:
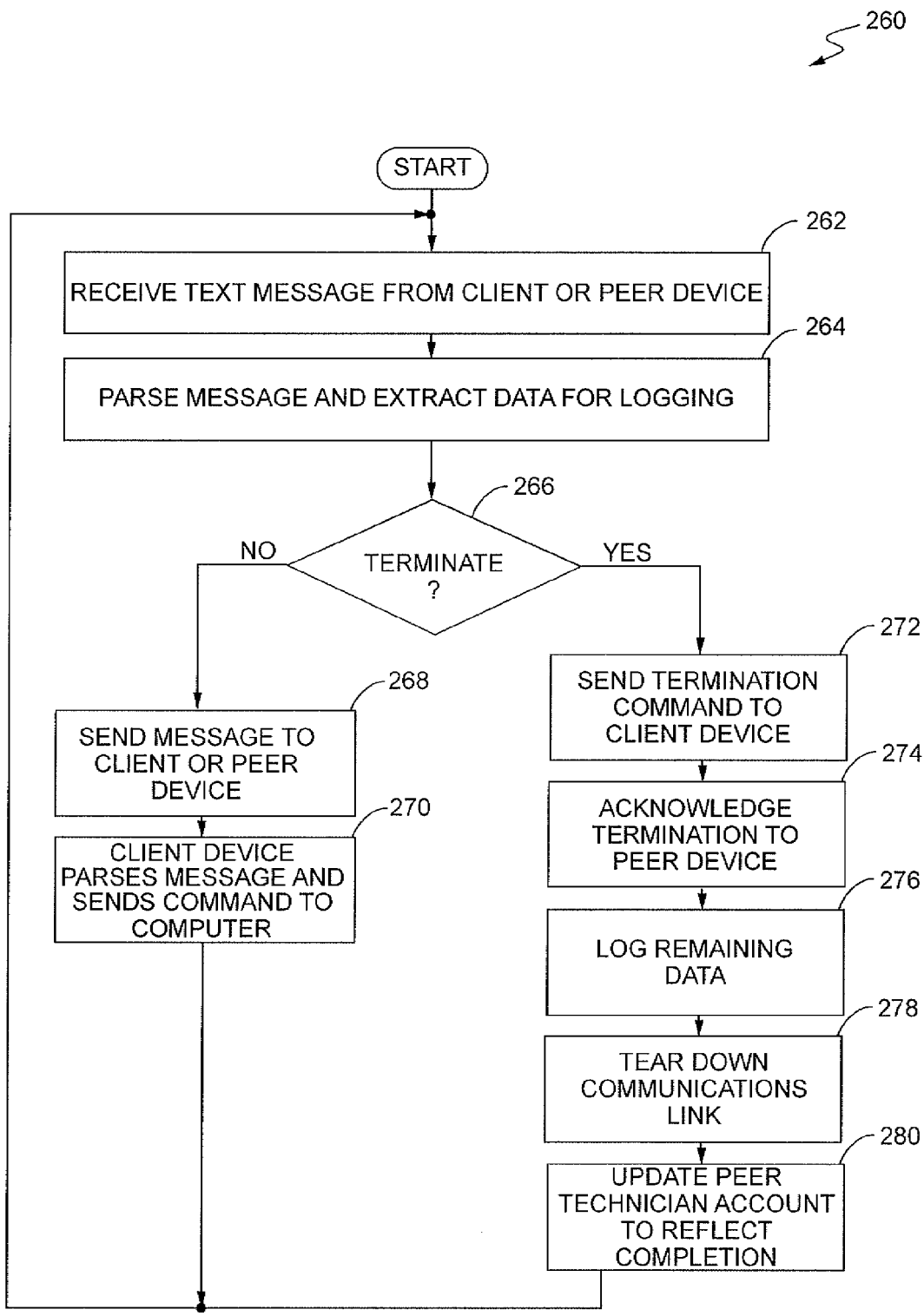

FIGS. 12A-12C are flow diagrams illustrating the method of performing the diagnostics and repair functions as performed by the server 16. Particularly, FIG. 12A illustrates a method 210 by which the server 16 registers the peer devices 90. The method 210 begins when the server receives a registration request message from a peer device 90 (box 212). The message may contain a variety of parameters, such as the MEI of the peer device 90, and the name/personal information associated with the peer technician. Upon receipt of the request message, the server 16 creates an account for the peer technician (box 214).

In creating the account, the server 16 stores the personal information of the peer technician and the MEI of the peer device in DB 18. The account may contain a field that stores a value representing a number of accumulated points. Each time the peer technician successfully completes a task (e.g., successfully perform diagnostic and repair functions on computer 24), server 16 awards the peer technician with a predetermined number of points or tokens. At some point, the peer technician can redeem the points for various items of interest.

Once the account is created, server 16 sends an acknowledgement to the peer device 90 (box 216). The server 16 also marks the peer technician's status as "AVAILABLE" upon receiving a status message from the peer device 90 (box 218). Thereafter, the server 16 will monitor for messages from the peer device 90. If the server 16 receives subsequent status messages from the peer device 90, the server 16 will parse the message to determine whether the peer device 90 is "AVAILABLE" or "UNAVAILABLE" (box 220). For example, the server 16 may look for a specific indicator or value in the received message that indicates the peer device 90 as being "AVAILABLE" or "UNAVAILABLE." The server 16 will then mark the account of the peer technician as being "AVAILABLE" (box 222) or "UNAVAILABLE" (box 224) based on the indicator or value in the received message.

FIG. 12B is a flow diagram of a method 230 illustrating how server 16 registers a client device 20 according to one embodiment of the present invention. Method 230 begins with the server 16 receiving a registration request message from the client device 20 (box 232). The server creates a user account for the client (box 234) and then returns an acknowledgement to the client device 20 (box 236). Then, as previously described, a peer technician may be selected either for the user, or by the user.

In one embodiment, the server 16 selects the peer technician for the user. Particularly, the server 16 tracks the presence of the peer devices 90 and their availability to perform the diagnostics and repair functions for the client device 20. Based on the status information provided by the peer devices 90, the server 16 selects one of the "AVAILABLE" peer devices 90 (box 238). Any method known in the art may be used to select a peer device 90, but in this embodiment, server 16 simply picks the first available peer device 90 on a list of peer devices 90. Once selected, the server 16 sends a notification message to the selected peer device 90 (box 240). The notification may include, for example, information identifying the client device 20. Server 16 also sends a notification message to the client device 20 identifying the selected peer device 90 (box 242). Then, server 16 establishes a communications link between the client and peer devices 20, 90 (box 252) so that the devices can communicate. Thereafter, the server 16 brokers the text messages sent and received between the client and peer devices 20, 90 (box 254).

In another embodiment, the user of the client device 20 is empowered to select his or her own peer technician. In this embodiment, the server 16 would first receive a request from the client device 20 for the list of peer devices (box 244). In response, server 16 retrieves the list of peer devices 90 from memory, such as DB 18 (box 246), and sends the list to the client device 20. The list may be, for example, the list of peer devices 90 seen in FIG. 9. As stated previously, upon the user at client device 20 selecting a peer device 90 from the list, the server 16 receives a message identifying the selected peer device 90 (box 248). The server 16 then sends a notification message to the peer device 90 (box 250), establishes the communications link between the client and peer devices 20, 90 (box 252), and brokers the text messages communicated between the client and peer devices 20, 90, as previously described.

FIG. 12C is a flow diagram of a method 260 illustrating how the server 16 brokers the text messages between the client and peer devices 20, 90. In this embodiment, it is assumed that a peer device 90 is controlling the client device 20 from a remote location to perform the diagnostics and repair functions on the computer 24.

As seen in FIG. 12C, method 260 begins with the server 16 receiving a text message from one of the client and peer devices 20, 90 (box 262). The server 16 will first parse the text message and extract any information it needs for logging (box 264). Then, server 16 determines whether the text message contains a termination command to terminate the session (box 266). For example, a termination message may include a predefined value or flag in the header or body of the message that the server recognizes as a termination indicator. If the message does not contain a termination indicator, the server 16 simply forwards the message to the appropriate device (i.e., the client or peer device 20, 90) identified as the destination in the message (box 268). Upon receipt, the client device 20 parses the message to extract the command and any associated parameters, and sends the command and parameters to the computer 24 for execution, as previously described (box 270). If the text message does contain a termination indicator (box 266), server 16 sends a termination command to the client device 20 (box 272) and sends an acknowledgement to the peer device 90 acknowledging the termination of the session (box 274). The server 16 then logs any remaining data that may be sent by one or both of the client and peer devices 20, 90 (box 276) and tears down the communications link (box 278). The server 16 then updates the peer technician's account with the appropriate number of points for successfully completing the diagnostics and repair functions (box 280).

The present invention may, of course, be carried out in other ways than those specifically set forth herein without departing from essential characteristics of the invention. For example, the communications between the client and peer devices 20, 90 need not be brokered exclusively by the server 16. In one embodiment, the client and peer devices 20, 90 both register with the server 16, but then communicate text messages with the embedded commands via the wireless network 22.

Further, the previous embodiments describe the communication medium between the client device 20 and the computer 24 as being a USB cable. However, the present invention is not so limited. In another embodiment, the client device 20 and computer 24 are communicatively connected via a THUNDERBOLT interface.

Additionally, the client device 20 has been described as performing the diagnostics and repair functions on computer 24 pursuant to a limited license. The activation and termination of that license may be in response to any event needed or desired. For example, the server 16 can activate the control program 40 to perform the diagnostics and repair functions for a predefined number of times (e.g., once), and/or for a predefined time period (e.g., 24 hours), upon successfully registering the client device 20. During the "activation" period, the client device 20 can control the computer 24 to perform the diagnostics and repair functions, as previously described. Once the "activation" period expires, the server 16, or the client device 20, would generate the appropriate message or signal to deactivate the control program on the client device 20 and remove the diagnostics and repair programs 44, as previously described.

Therefore, the present embodiments are to be considered in all respects as illustrative and not restrictive, and all changes coming within the meaning and equivalency range of the appended claims are intended to be embraced therein.

What is claimed is:

1. A method, implemented at a client cellular communication device, of performing diagnostic and/or repair functions on a computing device, the method comprising:

establishing a communications link between a client cellular device and a computing device;

transferring application programs to the computing device via the established link, the application programs including an emulator agent that configures the computing device to emulate a cellular communications device, and one or more diagnostic and/or repair functions;

activating the emulator agent on the computing device;

establishing a communications channel with a selected peer device;

receiving a text message from the selected peer device, the message including a command associated with a selected diagnostic and/or repair function to be executed on the computing device; and controlling the computing device, via the emulator agent, to execute the selected diagnostic and/or repair function.

2. The method of claim 1 wherein establishing a communication link comprises connecting the client device to a Universal Serial Bus (USB) port on the computing device via a USB cable.

3. The method of claim 1 further comprising controlling the computing device, via the emulator agent, to:
automatically reconfigure selected settings on the computing device to allow the computing device to send and receive data with the client device; and
switch an operating mode of the computing device from a current operating mode to the diagnostic mode.

4. The method of claim 3 wherein automatically reconfiguring selected settings on the computing device comprises one or more of:
automatically enabling one or more predetermined ports on the computing device;
automatically configuring security permissions on the computing device;
automatically modifying one or more parameters of a firewall executing on the computing device; and
automatically activating a command shell at the computing device.

5. The method of claim 1 wherein controlling the computing device, via the emulator agent, to execute selected diagnostic and/or repair functions at the computing device comprises:
generating a command to execute a selected diagnostic and/or repair function; and
sending the command over a predefined port to the emulator agent on the computing device.

6. The method of claim 1 further comprising:
receiving report data from the emulator agent comprising indicating results of the selected diagnostic and/or repair functions; and
sending the report data to a server in a communications network.

7. The method of claim 1 wherein controlling the computing device to execute selected diagnostic and/or repair functions comprises sending the received command to a command shell executing on the computing device via the emulator agent.

8. The method of claim 1 further comprising:
receiving a list of available peer devices from a server in a communication network;
selecting a peer device from the list of available peer devices to be the selected peer device;
identifying the selected peer device to the server.

9. The method of claim 1 further comprising receiving an identifier from a server in a communication network identifying the selected peer device.

10. A method, implemented at a client cellular communication device, of performing diagnostic and/or repair functions on a computing device, the method comprising:
establishing a communications link between a client cellular device and a computing device;
transferring application programs to the computing device via the established link, the application programs including an emulator agent that configures the computing device to emulate a cellular communications device, and one or more diagnostic and/or repair functions;
activating the emulator agent on the computing device; and
controlling the computing device, via the emulator agent, to:
execute a selected diagnostic and/or repair function;
automatically reset the settings on the computing device to switch the computing device from a diagnostic mode to a first operating mode; and
uninstall the application programs from the computing device.

11. A method, implemented at a client cellular communication device, of performing diagnostic and/or repair functions on a computing device, the method comprising:
establishing a communications link between a client cellular device and a computing device;
downloading a command interpreter and application programs to the client device from a network server;
transferring the application programs to the computing device via the established link, the application programs including an emulator agent that configures the computing device to emulate a cellular communications device, and one or more diagnostic and/or repair functions;
activating the emulator agent on the computing device;
receiving messages from a selected peer device, wherein the messages contain embedded commands;
controlling the computing device to execute selected diagnostic and/or repair functions based on the embedded commands received at the command interpreter; and
deactivating the command interpreter and the application programs at the client device responsive to the command interpreter receiving a termination command from the selected peer device.

12. A method, implemented at a client cellular communication device, of performing diagnostic and/or repair functions on a computing device, the method comprising:
establishing a communications link between a client cellular device and a computing device;
downloading a control application and application programs to the client device from a network server;
transferring the application programs to the computing device via the established link, the application programs including an emulator agent that configures the computing device to emulate a cellular communications device, and one or more diagnostic and/or repair functions;
activating the emulator agent on the computing device;
generating one or more commands to control the computing device to perform selected diagnostic and/or repair functions;
controlling the computing device, via the emulator agent, to execute the selected diagnostic and/or repair functions; and
deactivating the control application and the application programs at the client device responsive to a termination command.

13. A cellular communications device for a user, the device comprising:
- a system interface port configured to receive a cable communicatively connecting the user's cellular communications device to a computing device;
- memory configured to store one or more application programs downloaded from a network application server, the application programs including an emulator agent that configures the computing device to emulate a cellular communications device, and one or more diagnostic and/or repair functions; and
- a programmable controller configured to:
  - transfer the application programs from the memory to the computing device via the system interface port;
  - activate the emulator agent on the computing device;
  - establish a communications channel with a selected peer device;
  - receive a text message from the selected peer device, the message including a command associated with a selected diagnostic and/or repair function to be executed on the computing device; and
  - control the computing device, via the emulator agent, to execute the selected diagnostic and/or repair function.

14. The device of claim 13 wherein the cable connecting the system interface port and the computing device comprises a Universal Serial Bus (USB) cable.

15. The device of claim 13 wherein the controller is further configured to send one or more commands to the emulator agent to control the computing device to:
- automatically reconfigure selected settings on the computing device to allow the computing device to send and receive data with the user's cellular device; and
- switch an operating mode of the computing device from a current operating mode to a diagnostic mode.

16. The device of claim 15 wherein the controller is configured to automatically reconfigure the selected settings on the computing device by performing one or more of:
- automatically enabling one or more predetermined ports on the computing device;
- automatically configuring security permissions on the computing device;
- automatically modifying one or more parameters of a firewall executing on the computing device; and
- automatically activating a command shell at the computing device.

17. The device of claim 13 wherein the controller is configured to control the computing device by:
- generating a command to execute the selected diagnostic and/or repair function; and
- sending the command over a predefined port to the emulator agent on the computing device.

18. The device of claim 13 wherein the controller is configured to:
- receive report data from the emulator agent indicating results of the selected diagnostic and/or repair function; and
- send the report data to a server in a communications network.

19. The device of claim 13 wherein the controller is configured send the received command to a command shell executing on the computing device via the emulator agent to control the computing device to execute the selected diagnostic and/or repair function.

20. The device of claim 13 wherein the controller is further configured to:
- receive a list of available peer devices from a server in a communication network;
- select a peer device from the list of available peer devices to be the selected peer device;
- identify the selected peer device to the server.

21. The device of claim 13 wherein the controller is further configured to receive an identifier from a server in a communication network identifying the selected peer device.

22. A cellular communications device for a user, the device comprising:
- a system interface port configured to receive a cable communicatively connecting the user's cellular communications device to a computing device;
- memory configured to store one or more application programs downloaded from a network application server, the application programs including an emulator agent that configures the computing device to emulate a cellular communications device, and one or more diagnostic and/or repair functions; and
- a programmable controller configured to:
  - transfer the application programs from the memory to the computing device via the system interface port;
  - activate the emulator agent on the computing device;
  - control the computing device, via the emulator agent, to execute selected diagnostic and/or repair functions;
  - automatically reset settings on the computing device to switch the computing device from a diagnostic mode to a first operating mode; and
  - uninstall the application programs from the computing device.

23. A cellular communications device for a user, the device comprising:
- a system interface port configured to receive a cable communicatively connecting the user's cellular communications device to a computing device;
- memory configured to store one or more application programs downloaded from a network application server, the application programs including an emulator agent that configures the computing device to emulate a cellular communications device, and one or more diagnostic and/or repair functions; and
- a programmable controller configured to:
  - download a command interpreter and the application programs from the network application server;
  - transfer the application programs from the memory to the computing device via the system interface port;
  - activate the emulator agent on the computing device;
  - receive messages from a selected peer device, wherein the messages contain embedded commands;
  - control the computing device, via the emulator agent, to execute selected diagnostic and/or repair functions based on the embedded commands received at the command interpreter; and
  - deactivate the command interpreter and the application programs at the client device responsive to receiving a termination command.

24. A cellular communications device for a user, the device comprising:
- a system interface port configured to receive a cable communicatively connecting the user's cellular communications device to a computing device;
- memory configured to store one or more application programs downloaded from a network application server, the application programs including an emulator agent that configures the computing device to emulate a cellular communications device, and one or more diagnostic and/or repair functions; and a programmable controller configured to:
- download a control application and the application programs from the network application server;
- transfer the application programs from the memory to the computing device via the system interface port;
- activate the emulator agent on the computing device;
- generate one or more commands to control the computing device to perform selected diagnostic and/or repair functions;
- control the computing device, via the emulator agent, to execute the selected diagnostic and/or repair functions; and
- deactivate the control application and the application programs responsive to a termination command.

* * * * *